US012686298B2

(12) United States Patent
Demont et al.

(10) Patent No.: US 12,686,298 B2
(45) Date of Patent: Jul. 21, 2026

(54) BATTERY MODULE FOR AN ELECTRICALLY-DRIVEN AIRCRAFT, METHOD FOR MANUFACTURING A BATTERY MODULE AND ELECTRICALLY-DRIVEN AIRCRAFT POWERED BY A BATTERY MODULE

(71) Applicant: H55 SA, Sion (CH)

(72) Inventors: Sébastien Demont, Ayent (CH);
Franco Summermatter, Sion (CH);
Sébastien Luisier, Bruson (CH);
Eduardo Guzman Roca, Sion (CH);
Daniel Diaz, Sierre (CH); Gianmichele Bertini, Forli (IT)

(73) Assignee: H55 SA, Sion (CH)

( * ) Notice: Subject to any disclaimer, the term of this patent is extended or adjusted under 35 U.S.C. 154(b) by 55 days.

(21) Appl. No.: 18/579,299

(22) PCT Filed: Mar. 17, 2022

(86) PCT No.: PCT/IB2022/052444
§ 371 (c)(1),
(2) Date: Jan. 12, 2024

(87) PCT Pub. No.: WO2023/285882
PCT Pub. Date: Jan. 19, 2023

(65) Prior Publication Data
US 2024/0317109 A1 Sep. 26, 2024

(51) Int. Cl.
*B60L 58/18* (2019.01)
*B60L 3/00* (2019.01)
(Continued)

(52) U.S. Cl.
CPC ............. *B60L 58/18* (2019.02); *B60L 3/0061* (2013.01); *B60L 50/40* (2019.02); *B60L 53/00* (2019.02);
(Continued)

(58) Field of Classification Search
None
See application file for complete search history.

(56) References Cited

U.S. PATENT DOCUMENTS

| | | | |
|---|---|---|---|
| 4,434,389 A | 2/1984 | Langley et al. | |
| 4,550,267 A | 10/1985 | Vaidya | |

(Continued)

FOREIGN PATENT DOCUMENTS

| | | |
|---|---|---|
| CN | 102255113 | 11/2011 |
| CN | 105711434 A | 6/2016 |

(Continued)

OTHER PUBLICATIONS

Farrell et al., "Designing a Battery Exchange Building for Automated Guided Vehicles", Ports 2016, American Society of Civil Engineers, 2016, pp. 71-80.
(Continued)

*Primary Examiner* — Ryan Johnson
*Assistant Examiner* — Aqeel H Bukhari
(74) *Attorney, Agent, or Firm* — Knobbe, Martens, Olson & Bear, LLP

(57) ABSTRACT

A battery module for an electrically-driven aircraft is disclosed. The battery module can house multiple battery cells and prevent a battery cell fire or explosion from one battery cell from damaging neighboring battery cells. The battery module includes: a housing; a plurality of cell tubes housing a plurality of battery cells, each cell tube having an elongated surface and being positioned in the housing spaced apart from each other; a heat absorbing member comprising
(Continued)

a heat absorbing material, wherein the heat absorbing member is arranged between at least two neighboring cell tubes; and the heat absorbing material being configured to undergo a phase transition from an initial state of matter into a final state of matter when at least one of the plurality of cell tubes exceeds a predetermined temperature in case of explosion or fire of at least one of the plurality of battery cells.

29 Claims, 24 Drawing Sheets

(51) Int. Cl.

| | |
|---|---|
| *B60L 50/40* | (2019.01) |
| *B60L 53/00* | (2019.01) |
| *B64D 27/24* | (2024.01) |
| *B64D 45/00* | (2006.01) |
| *B64F 5/60* | (2017.01) |
| *H02J 7/14* | (2006.01) |
| *H02J 7/34* | (2006.01) |
| *H02P 5/00* | (2016.01) |

(52) U.S. Cl.
CPC ............. *B64D 27/24* (2013.01); *B64D 45/00* (2013.01); *B64F 5/60* (2017.01); *H02J 7/1423* (2013.01); *H02P 5/00* (2013.01); *B60L 2200/10* (2013.01); *B60L 2240/36* (2013.01); *B64D 2045/0085* (2013.01); *B64D 2221/00* (2013.01); *H02J 7/143* (2020.01); *H02J 7/345* (2013.01)

(56) References Cited

U.S. PATENT DOCUMENTS

| | | | |
|---|---|---|---|
| 4,730,150 | A | 3/1988 | Lee et al. |
| 4,965,879 | A | 10/1990 | Fischer, Jr. |
| 5,030,898 | A | 7/1991 | Hokanson et al. |
| 5,225,764 | A | 7/1993 | Falater |
| 5,414,339 | A | 5/1995 | Masaki et al. |
| 5,850,113 | A | 12/1998 | Weimer et al. |
| 6,078,165 | A | 6/2000 | Ashtiani et al. |
| 6,108,347 | A | 8/2000 | Holmquist |
| 6,153,942 | A | 11/2000 | Roseman et al. |
| 6,178,736 | B1 | 1/2001 | Massey |
| 6,366,311 | B1 | 4/2002 | Monroe |
| 6,439,504 | B1 | 8/2002 | Ahrendt |
| 6,791,226 | B1 | 9/2004 | Dhawan |
| 7,207,521 | B2 | 4/2007 | Atkey et al. |
| 7,482,767 | B2 | 1/2009 | Tether |
| 7,598,703 | B2 | 10/2009 | Zhang et al. |
| 7,706,398 | B2 | 4/2010 | Jung et al. |
| 8,120,310 | B2 | 2/2012 | Littrell et al. |
| 8,281,051 | B2 | 10/2012 | Hartwich |
| 8,341,449 | B2 | 12/2012 | Daniel et al. |
| 8,399,112 | B2 | 3/2013 | Yasui et al. |
| 8,738,217 | B2 | 5/2014 | Banker |
| 8,974,930 | B2 | 3/2015 | Oguri et al. |
| 9,436,261 | B2 | 9/2016 | Yun |
| 9,457,666 | B2 | 10/2016 | Caldeira et al. |
| 9,564,762 | B2 | 2/2017 | Lee et al. |
| 9,643,729 | B2 | 5/2017 | Walter-Robinson |
| 9,659,415 | B2 | 5/2017 | Lee |
| 9,776,731 | B1 | 10/2017 | Liberman et al. |
| 9,806,308 | B2 | 10/2017 | Watanabe et al. |
| 9,806,310 | B1 | 10/2017 | Pounds |
| 9,893,335 | B2 | 2/2018 | Liu |
| 10,131,246 | B2 | 11/2018 | Demont |
| 10,177,698 | B1 | 1/2019 | Gao et al. |
| 10,186,694 | B2 | 1/2019 | Ueda et al. |
| 10,186,697 | B1 | 1/2019 | Harris, III |
| 10,204,244 | B2 | 2/2019 | Butler |
| 10,305,078 | B1 | 5/2019 | Harris, III |
| 10,322,824 | B1 | 6/2019 | Demont et al. |
| 10,326,158 | B2 | 6/2019 | Lee |
| 10,479,223 | B2 | 11/2019 | Demont |
| 10,576,843 | B2 | 3/2020 | Demont et al. |
| 10,608,304 | B2 | 3/2020 | Ruehle |
| 10,854,866 | B2 | 12/2020 | Demont |
| 11,059,386 | B2 | 7/2021 | Demont et al. |
| 11,063,323 | B2 | 7/2021 | Demont |
| 11,065,979 | B1 | 7/2021 | Demont |
| 11,128,251 | B1 | 9/2021 | Solodovnik et al. |
| 11,148,819 | B2 | 10/2021 | Demont |
| 11,799,151 | B1* | 10/2023 | Arkus ................ H01M 50/204 |
| 2003/0143460 | A1 | 7/2003 | Yoshida |
| 2003/0182040 | A1 | 9/2003 | Davidson |
| 2003/0232236 | A1 | 12/2003 | Mitchell et al. |
| 2004/0119427 | A1 | 6/2004 | Stridsberg |
| 2004/0236480 | A1 | 11/2004 | Granger et al. |
| 2005/0162172 | A1 | 7/2005 | Bertness |
| 2006/0109009 | A1 | 5/2006 | Banke |
| 2007/0044737 | A1 | 3/2007 | Lindsey |
| 2007/0052806 | A1 | 3/2007 | Bnayahu et al. |
| 2007/0164166 | A1 | 7/2007 | Hirvonen |
| 2007/0164168 | A1 | 7/2007 | Hirvonen et al. |
| 2007/0202792 | A1 | 8/2007 | Shimizu et al. |
| 2008/0006739 | A1 | 1/2008 | Mochida et al. |
| 2008/0103632 | A1 | 5/2008 | Saban et al. |
| 2008/0211309 | A1 | 9/2008 | Nolte |
| 2008/0272669 | A1 | 11/2008 | Mohle et al. |
| 2009/0111007 | A1 | 4/2009 | Naganuma |
| 2009/0111015 | A1 | 4/2009 | Wood et al. |
| 2009/0139781 | A1 | 6/2009 | Straubel |
| 2009/0142653 | A1 | 6/2009 | Okada et al. |
| 2009/0155680 | A1 | 6/2009 | Maguire et al. |
| 2009/0206661 | A1 | 8/2009 | Baumann et al. |
| 2009/0212626 | A1 | 8/2009 | Snyder |
| 2009/0233162 | A1 | 9/2009 | Fang et al. |
| 2009/0302153 | A1 | 12/2009 | Matasso |
| 2010/0007293 | A1 | 1/2010 | Meadors et al. |
| 2010/0028758 | A1* | 2/2010 | Eaves ............... H01M 10/6555 |
| | | | 429/50 |
| 2010/0075213 | A1 | 3/2010 | Mehta et al. |
| 2010/0101242 | A1 | 4/2010 | Froelich |
| 2010/0102934 | A1 | 4/2010 | Guichard |
| 2010/0121587 | A1 | 5/2010 | Vian |
| 2010/0136396 | A1 | 6/2010 | Hermann et al. |
| 2010/0190049 | A1 | 7/2010 | Kawase et al. |
| 2010/0248008 | A1 | 9/2010 | Sugawara et al. |
| 2010/0255359 | A1 | 10/2010 | Hirakawa et al. |
| 2011/0054721 | A1 | 3/2011 | Goodrich |
| 2011/0063137 | A1 | 3/2011 | Pimouguet et al. |
| 2011/0200854 | A1 | 8/2011 | Bak et al. |
| 2011/0254502 | A1 | 10/2011 | Yount et al. |
| 2011/0293986 | A1* | 12/2011 | Kozu ................ H01M 10/6563 |
| | | | 429/120 |
| 2012/0025032 | A1 | 2/2012 | Hopdjanian |
| 2012/0070710 | A1 | 3/2012 | Kritzer et al. |
| 2012/0121949 | A1 | 5/2012 | Eberhard et al. |
| 2012/0146581 | A1 | 6/2012 | Tu |
| 2012/0161676 | A1 | 6/2012 | White |
| 2012/0166031 | A1 | 6/2012 | Nishida |
| 2012/0177970 | A1 | 7/2012 | Marchio et al. |
| 2012/0203482 | A1 | 8/2012 | Parle et al. |
| 2012/0242144 | A1 | 9/2012 | Chorian et al. |
| 2012/0244404 | A1 | 9/2012 | Obasih et al. |
| 2012/0268069 | A1 | 10/2012 | Park |
| 2013/0024053 | A1 | 1/2013 | Caule et al. |
| 2013/0040178 | A1 | 2/2013 | Lim |
| 2013/0076190 | A1 | 3/2013 | Jarvinen et al. |
| 2013/0090813 | A1 | 4/2013 | Kanekawa |
| 2013/0216871 | A1 | 8/2013 | Lee |
| 2013/0305391 | A1 | 11/2013 | Haukom |
| 2014/0035357 | A1 | 2/2014 | Hausmann et al. |
| 2014/0084817 | A1 | 3/2014 | Bhavaraju |
| 2014/0197681 | A1 | 7/2014 | Iwashima |
| 2014/0212695 | A1 | 7/2014 | Lane |
| 2014/0283360 | A1 | 9/2014 | Takeda et al. |
| 2014/0303812 | A1 | 10/2014 | Avritch et al. |
| 2014/0339371 | A1 | 11/2014 | Yates et al. |
| 2014/0342201 | A1 | 11/2014 | Andres |
| 2015/0019771 | A1 | 1/2015 | Greef |

(56) References Cited

U.S. PATENT DOCUMENTS

| | | |
|---|---|---|
| 2015/0115108 A1 | 4/2015 | Benson et al. |
| 2015/0123622 A1 | 5/2015 | Yasui |
| 2015/0130471 A1 | 5/2015 | Bolduc |
| 2015/0221914 A1 | 8/2015 | Page et al. |
| 2015/0232191 A1 | 8/2015 | Wetzel |
| 2015/0263546 A1 | 9/2015 | Senoo |
| 2015/0285165 A1 | 10/2015 | Steinwandel |
| 2015/0339371 A1 | 11/2015 | Cao et al. |
| 2015/0344156 A1 | 12/2015 | Vail, III |
| 2015/0353192 A1 | 12/2015 | Morrison |
| 2015/0358002 A1 | 12/2015 | Startin |
| 2015/0382496 A1 | 12/2015 | Burant, Jr. |
| 2016/0036308 A1 | 2/2016 | Bailey et al. |
| 2016/0047861 A1 | 2/2016 | Chen |
| 2016/0107758 A1 | 4/2016 | Esteyne et al. |
| 2016/0149169 A1 | 5/2016 | Okura |
| 2016/0167800 A1 | 6/2016 | Joubert et al. |
| 2016/0197386 A1 | 7/2016 | Moon et al. |
| 2016/0218579 A1 | 7/2016 | Peng et al. |
| 2016/0226042 A1* | 8/2016 | Hartmann ........... H01M 50/213 |
| 2016/0236790 A1 | 8/2016 | Knapp |
| 2016/0254576 A1 | 9/2016 | Burns |
| 2016/0304214 A1 | 10/2016 | Himmelmann |
| 2016/0347180 A1 | 12/2016 | Steffani |
| 2016/0359329 A1 | 12/2016 | Kim et al. |
| 2017/0001511 A1 | 1/2017 | Kulkami |
| 2017/0008418 A1 | 1/2017 | Ciampolini et al. |
| 2017/0054314 A1 | 2/2017 | Tang |
| 2017/0057650 A1 | 3/2017 | Walter-Robinson |
| 2017/0066531 A1 | 3/2017 | McAdoo |
| 2017/0109980 A1 | 4/2017 | Engels et al. |
| 2017/0126025 A1 | 5/2017 | Bando et al. |
| 2017/0210229 A1 | 7/2017 | Brochhaus |
| 2017/0210481 A1 | 7/2017 | Bak |
| 2017/0214070 A1 | 7/2017 | Wang |
| 2017/0243413 A1 | 8/2017 | Haggerty et al. |
| 2017/0247126 A1 | 8/2017 | Blanding et al. |
| 2017/0253344 A1 | 9/2017 | Wangemann et al. |
| 2017/0309093 A1 | 10/2017 | Feng |
| 2017/0331163 A1 | 11/2017 | Ebner |
| 2017/0352931 A1 | 12/2017 | Yoshida et al. |
| 2018/0012484 A1 | 1/2018 | Sakabe |
| 2018/0022451 A1 | 1/2018 | Lim |
| 2018/0024201 A1 | 1/2018 | Izawa |
| 2018/0056794 A1 | 3/2018 | Kim et al. |
| 2018/0079530 A1 | 3/2018 | Wyrobek |
| 2018/0105282 A1 | 4/2018 | Tweet |
| 2018/0108188 A1 | 4/2018 | Canning |
| 2018/0138476 A1 | 5/2018 | Yamazaki et al. |
| 2018/0138478 A1 | 5/2018 | Chan |
| 2018/0170511 A1 | 6/2018 | Mores |
| 2018/0198154 A1 | 7/2018 | Lee |
| 2018/0229618 A1 | 8/2018 | Lee |
| 2018/0237148 A1 | 8/2018 | Hehn et al. |
| 2018/0268719 A1 | 9/2018 | Guan |
| 2018/0269436 A1 | 9/2018 | Lee et al. |
| 2018/0283292 A1 | 10/2018 | Steinwandel |
| 2018/0287234 A1 | 10/2018 | Melack et al. |
| 2018/0290682 A1 | 10/2018 | Nampei et al. |
| 2018/0301765 A1 | 10/2018 | Knape |
| 2018/0321325 A1 | 11/2018 | Fortier |
| 2018/0358593 A1 | 12/2018 | Seo |
| 2018/0358671 A1* | 12/2018 | Halsey .............. H01M 10/6557 |
| 2019/0006650 A1 | 1/2019 | Bryla |
| 2019/0019638 A1 | 1/2019 | Humphreys |
| 2019/0097203 A1 | 3/2019 | Kwag |
| 2019/0097204 A1 | 3/2019 | Liposky |
| 2019/0097282 A1 | 3/2019 | Melack et al. |
| 2019/0135403 A1 | 5/2019 | Perry et al. |
| 2019/0140233 A1 | 5/2019 | Yeh |
| 2019/0212733 A1 | 7/2019 | Lan |
| 2019/0221814 A1 | 7/2019 | Shimizu |
| 2019/0229542 A1 | 7/2019 | Dunn |
| 2019/0252652 A1 | 8/2019 | Guillemard |
| 2019/0263498 A1 | 8/2019 | Bernasconi et al. |
| 2019/0280354 A1 | 9/2019 | Schlak et al. |
| 2019/0283611 A1 | 9/2019 | Conlon |
| 2019/0296300 A1 | 9/2019 | Zimmermann et al. |
| 2019/0319448 A1 | 10/2019 | Pevear |
| 2019/0337409 A1 | 11/2019 | Demont et al. |
| 2020/0035967 A1 | 1/2020 | Yoon |
| 2020/0080793 A1 | 3/2020 | Houle |
| 2020/0231047 A1 | 7/2020 | Demont |
| 2020/0339010 A1 | 10/2020 | Villanueva et al. |
| 2020/0385137 A1 | 12/2020 | Dionne |
| 2021/0075283 A1 | 3/2021 | Turvey |
| 2021/0083255 A1 | 3/2021 | Demont et al. |
| 2021/0163142 A1 | 6/2021 | Lacko et al. |
| 2021/0391627 A1* | 12/2021 | Villanueva .......... H01M 50/358 |
| 2022/0181732 A1 | 6/2022 | Weis |
| 2022/0181742 A1 | 6/2022 | Mabrey et al. |
| 2022/0209336 A1 | 6/2022 | Deliang |
| 2022/0407145 A1* | 12/2022 | Devarakonda .... H01M 10/6557 |
| 2023/0027399 A1 | 1/2023 | Weigman |

FOREIGN PATENT DOCUMENTS

| | | |
|---|---|---|
| CN | 205377342 U | 7/2016 |
| CN | 106314809 A | 1/2017 |
| CN | 111252256 A | 6/2020 |
| CN | 211017160 U | 7/2020 |
| CN | 214706088 U | 11/2021 |
| CN | 217009350 U | 7/2022 |
| DE | 102007054228 | 5/2009 |
| DE | 102013217458 | 3/2015 |
| DE | 102014200997 | 7/2015 |
| DE | 102016204720 | 9/2017 |
| DE | 10 2016 109 277 | 11/2017 |
| DE | 102017122850 | 4/2019 |
| DE | 102018124793 | 4/2020 |
| EP | 2451059 | 5/2012 |
| EP | 3796413 | 3/2021 |
| FR | 2988522 | 9/2013 |
| JP | 2011-114961 | 6/2011 |
| JP | 2012-160347 | 8/2012 |
| JP | 2012-175823 | 9/2012 |
| JP | 2013-84444 | 5/2013 |
| KR | 10-1733159 | 5/2017 |
| KR | 20180009020 | 1/2018 |
| RU | 2011126465 | 1/2013 |
| WO | WO 94/14226 | 6/1994 |
| WO | WO 03/026201 | 3/2003 |
| WO | WO 2004/068694 | 8/2004 |
| WO | WO 2011/100957 | 8/2011 |
| WO | WO 2012/014348 | 2/2012 |
| WO | WO 2012/147150 | 11/2012 |
| WO | WO 2015/168320 | 11/2015 |
| WO | WO 2018/053680 | 3/2018 |
| WO | WO 2018/130488 | 7/2018 |
| WO | WO 2019/006469 | 1/2019 |
| WO | WO 2019/206409 | 10/2019 |
| WO | WO 2019/211810 | 11/2019 |
| WO | WO 2020/044134 | 3/2020 |
| WO | WO 2020/044275 | 3/2020 |
| WO | WO 2022/072641 | 4/2022 |

OTHER PUBLICATIONS

Saw et al., "Computational fluid dynamic and thermal analysis of Lithium-ion battery pack with air cooling", Applied Energy vol. 177, 2016, pp. 783-792.

H55 Products, https://www.h55.ch/products, date accessed Jan. 16, 2020, in 6 pages.

International Search Report and Written Opinion for International Application No. PCT/IB2022/052444, mailed Jun. 9, 2022, in 9 pages.

World's First Portable EV Power Unit On Sale Now, https://insideevs.com/worlds-first-portable-ev-power-unit-is-on-sale-now, dated Jun. 2012, in 6 pages.

* cited by examiner

800

814

813

812

700        702        800

BATTERY MODULE FOR AN ELECTRICALLY-DRIVEN AIRCRAFT, METHOD FOR MANUFACTURING A BATTERY MODULE AND ELECTRICALLY-DRIVEN AIRCRAFT POWERED BY A BATTERY MODULE

TECHNICAL DOMAIN

The present invention concerns a battery module for an electrically-driven aircraft with enhanced fire resistance and a method for manufacturing said battery module. The present invention further concerns an electrically-driven aircraft powered by a battery module.

RELATED ART

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

Flying an aircraft, such an airplane, can be dangerous. Problems with the aircraft may result in injury or loss of life for passengers in the aircraft or individuals on the ground, as well as damage to goods being transported by the aircraft or other items around the aircraft.

In order to attempt to mitigate potential problems associated with an aircraft, numerous organizations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

Such certification standards have unfortunately had the effect of slowing commercial adoption and production of electric or hybrid aircraft. Electric or hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

The present disclosure provides simplified, yet robust, components and systems for an electric powered aircraft that simplify and streamline certifications requirements and reduce the cost and time required to produce a commercially viable electrically-driven aircraft.

In particular, safely powering an electric or hybrid aircraft can pose significant difficulties. A power system of an electric or hybrid aircraft can include numerous battery cells, and each of the battery cells can pose a serious safety risk, such as in the event that one or more of the battery cells overheat and catch fire (for instance, due to a manufacturing defect, aging, or abuse of the one or more battery cells). If a fire in one battery cell were to reach other battery cells, the other battery cells may catch fire and cause a chain reaction that would result in the aircraft suffering a catastrophic failure. Thus, the power system of an electric or hybrid aircraft should be carefully managed.

The solutions known from the prior art to prevent a fire in one battery cell from reaching other battery cells are bulky, costly, and drastically increase the time for manufacturing a related power system at the same time.

SHORT DISCLOSURE OF THE INVENTION

Therefore, the present disclosure aims to provide a solution to one or more of the problems mentioned above of the prior art.

In particular, the present disclosure aims to provide an electric power system for use in powering an electric vehicle, such as an electric aircraft, in which the consequences of one or more cells overheating or catching fire are less dramatic than in prior art electric power systems. The battery module as disclosed herein continues to be operable even in case of fire.

Another aim of the present disclosure is to provide a method for manufacturing an electric power system for use in powering an electric vehicle, such as an electric aircraft, in which the effort for manufacturing an electric power system including a battery module is reduced significantly.

With respect to what is known in the art, the invention provides the advantage that the electric power system provides increased safety, in particular in the event when one of the battery cells catches fire and is easy and therefore fast to manufacture at the same time.

According to the invention, these aims are attained by the object of the attached claims, and especially by a battery module for an electrically-driven aircraft configured to house multiple battery cells and prevent a battery cell fire or explosion from one battery cell from damaging neighboring battery cells, the battery module including:

a plurality of battery cells, a housing and a plurality of cell tubes housing said battery cells each cell tube having an elongated surface and being positioned in the housing spaced apart from each other;

a heat absorbing member comprising a heat absorbing material, wherein the heat absorbing member is arranged between at least two neighboring cell tubes;

the heat absorbing material being configured to undergo a phase transition from an initial state of matter into a final state of matter when at least one of the plurality of cell tubes exceeds a predetermined temperature in case of explosion or fire of at least one of the plurality of battery cells.

The initial state of matter may be solid or liquid. The final state of matter is different from the initial state of matter and may be liquid or gaseous.

The heat absorbing material is thus provided between the cell tubes, to absorb heat transfer from one lateral side of the cell tube to another cell tube.

In one embodiment, no additional phase change material is provided between the top housing and the battery cells.

A battery cell catching fire or exploding is referred to as a thermal event in the disclosure.

Battery cells may be designed with a predetermined breaking point located at one of the terminals, preferably at the positive terminal, so that they may fail in a predictable matter (such as tending to catch fire and/or explode from a positive terminal of the battery cell and last for around 10 seconds).

The cell tubes act as individual battery housings to orient the multiple battery cells in the respective battery housings/battery module into a common direction, with the positive terminals of the plurality of battery cells being on a common end of the battery housing.

The cell tube can reinforce the sidewall of the battery cell to prevent lateral explosion of a battery cell and/or to direct the flames and part of the heat toward one end of the cell tube. Lateral explosion of a battery cell is rather unlikely, thus reducing this risk of reaching other cells or components in the same battery module. Upon one of the battery cells catching fire, the fire from the battery cell may pass the housing (which 25 may prevent the fire from reaching neighboring battery cells) and may be diverted towards an exhaust port of the aircraft so that the fumes, smoke, heat, steam, or combustion materials leave the aircraft in a controlled and predictable way.

The cell tube provides a first thermal capacity absorbing a first portion of the heat generated by a battery cell in a thermal event, and shielding thermal radiations. This thermal capacity of the cell tube prevents heat to be directly transferred to neighboring cell tubes/battery cells during such a thermal event. Nevertheless, due to the limited thermal capacity of the cell tube, heat might still be transferred to adjacent cell tubes, as a battery cell might burn for several seconds before a combustible material comprised in the battery cell is deflagrated completely. This heat transferred to neighboring cell tubes/battery cells can stoke a chain reaction and may lead to further thermal events in the battery module.

The invention combines the feature of the cell tube with a heat absorbing member being arranged between at least two neighboring cell tubes and comprising a material that undergoes at least one phase transition. The phase transition(s) of the material absorb most (if not all) of the thermal energy generated in the thermal event to prevent heat from being transferred to neighboring cell tubes.

The inventors found that cell tubes in combination with a heat absorbing member being configured with a material as disclosed before, provides a synergetic effect and extend the timespan until the heat may reach adjacent cell tubes. This time span can be longer than the time span in which a battery cell burns. This can prevent further thermal events in the same battery module.

It must be noted that many material can undergo a phase transition when being heated above or cooled below a predetermined temperature. Therefore, the main focus shall be on materials that absorb a sufficient amount of thermal energy for undergoing the phase transition within a specified temperature range only. This temperature range may preferably be between 320 K and 675 K and more preferably between 375 K and 475 K measured at average sea-level pressure. Thus, materials undergoing a phase transition below (e.g. sodium sulfate at 305 K) or above (e.g. copper at 1358 K) the defined temperature range shall not be considered as phase change material for the purpose of the invention.

The heat absorbing material may be configured to undergo a first phase transition from an initial state of matter, such as solid, into a second state of matter, such as liquid, when at least one of the plurality of cell tubes exceeds a first predetermined temperature threshold, for example when one battery cell overheats and needs to be cooled down to maintain its longevity, and a second phase transition from the second state of matter into a final state of matter, such as gas, when at least one of the plurality of cell tubes exceeds a second predetermined temperature threshold, for example in case of thermal event such as explosion.

The battery module may be configured to undergo a first said phase transition at a first temperature when the temperature exceeds a first threshold which is detrimental to the longevity of a battery cell, but which is not necessarily indicating a thermal event such as an explosion or fire of the battery cell, and a second phase transition at a second temperature threshold indicating an explosion or fire of at least one of the plurality of battery cells.

The heat absorbing member may comprise a first heat absorbing material and a second heat absorbing material. The first heat absorbing material may be configured to undergo a first phase transition from an initial state of matter into a second state of matter when at least one of the plurality of cell tubes exceeds a first predetermined temperature threshold, for example when one battery cell overheats and needs to be cooled down to maintain its longevity. The second heat absorbing material may be configured to undergo a second phase transition from an initial state of matter into a second state of matter when at least one of the plurality of cell tubes exceeds a second predetermined temperature threshold, for example in case of thermal event such as explosion.

The first heat absorbing material and the second heat absorbing material may be provided in the same pouch or in different pouches.

The provision of two phase transition at two different temperature thresholds may be used to cool down at least one battery cell with a first phase transition when the battery cell overheat, even if the excessive temperature is not caused by a thermal event. Both the first and the second phase transition cool down the battery cell in case of thermal event.

The first temperature threshold may be between 320K and 360K. The second temperature threshold may be between 375K and 675K, more preferably between 375 K and 475 K measured at average sea-level pressure.

According to another aspect of the invention, these aims are attained by the object of the attached claims, and especially by the method for manufacturing a battery module, including the steps of:
  providing a housing, a plurality of cell tubes for housing a plurality of battery cells, each having an elongated surface, a heat absorbing member;
  arranging said heat absorbing member such that the heat absorbing member surrounds partly or encloses each of the plurality of cell tubes and preferably extends along an entire length of the elongated surface of the plurality of cell tubes;

forming an assembly comprising the heat absorbing member and the plurality of cell tubes;
enclosing said assembly using the housing.

The steps for manufacturing a battery module might preferably be performed in the order set out before. However, it is possible to change the order when appropriate, for instance, first arranging the heat absorbing member and then arranging the battery cells in a consecutive step.

The heat absorbing member can be arranged in the assembly such that it loosely fits the structure. Alternatively, or in addition, the heat absorbing member might be brought into contact (by gluing, pressing, etc.) with the elongated surface with the plurality of cell tubes to form a more compact assembly.

The method for manufacturing is simple and can save time for manufacturing a battery module. This advantage is cumulative when multiple battery modules are produced for powering an electrically-driven aircraft.

According to another aspect of the invention, these aims are attained by the object of the attached claims, and especially by an electrically-driven aircraft powered by a battery module with the features as disclosed in a previous aspect of the invention.

Further advantages of the invention can be deducted from the disclosure herein provided.

The plurality of battery cells can be configured as lithium-ion battery cells or any other cell type with a high energy density. Lithium-ion battery cells are known to be problematic since they contain a flammable electrolyte and may become pressurized if damaged. The flammable electrolyte may cause fire and/or explosion hazards.

The housing of the battery module can be made of a non-conductive material but fire-resistive material, such as plastic. Elements, such as corrugates, might extend from the housing to improve a heat exchange with its environment.

The plurality of cell tubes may be made from metal, such as aluminium or aluminium oxide. Said materials are sufficiently stiff and heat resistive to guide the flames in case of a fire and provide a sufficient thermal conductivity at the same time.

The plurality of cell tubes may be formed in a shape of a hollow cylinder having an elongated outer surface also referred to as elongated surface.

The plurality of cell tubes can be arranged in the battery module housing spaced apart from each other, using a plurality of spacers, one spacer being attached to each end of each cell tube and inserted in a hole of a plate, such as a metal plate or a PCB. Any other suitable means to place the cell tubes apart from each other may be taken instead of or in addition to space the cell tubes apart from each other.

The spacer can circumferentially surround and support the outer diameter at one end of each cell tube. Accordingly, a tight or fluid-tight connection between the spacer and the one end of the corresponding cell tube can be provided, and preventing the transmission of heat from one cell or cell tube to another through the plate.

The spacer are preferably made of a heat-resistant non-metallic material, such as ceramic, a composite glass fiber, to prevent the transmission of heat from one cell tube to the other cell tubes through the plate.

Each of the plurality of cell tubes can be configured to house one battery cell only. Each of the plurality of cell tubes can be open at a first end of the cell tube configured to allow access to a cathode of one battery cell housed in the cell tube and can be open at a second end of the cell tube configured to allow access to an anode of one battery cell housed within the cell tube.

The heat absorbing member can be arranged at least in part between two neighboring cell tubes, such that it is not in direct contact with the elongated surface of the cell tubes. This leaves a space between two neighboring cell tubes and the heat absorbing member through which an air flow can pass. Alternatively, or in addition, the heat absorbing member can be arranged such that it is in direct contact with at least one of two neighboring cell tubes. This improves the heat exchange between the cell tube and the heat absorbing member in direct contact with the cell tube. This measure may be foreseen to reduce the size of an assembly comprising a plurality of cell tubes and at least one heat absorbing member. The drawback is that air flow may be prevented from flowing between the cell tubes and the heat absorbing member.

The heat absorbing member can comprise a shell which may hermetically enclose the heat absorbing material.

The heat absorbing material can undergo a phase transition at a temperature of 330 K, more preferably 398 K or most preferably 423 K, measured at average sea-level pressure.

The heat absorbing material can comprise a mixture of materials with different phase transition temperature.

The different materials may be mixed in a single shell, o stored in two separate shells.

The heat absorbing material can comprise a mixture of a first liquid, such as water, and paraffin. The paraffin may be encapsulated into the water. The paraffin may be solid at a temperature below 323 K. The paraffin may undergo a phase transition when it temperature exceeds a temperature threshold between 323 K and 335 K.

The heat absorbing material can comprise a mixture of water and alcohol and may comprise further ingredients, such as a salt to set the point at which the phase transition starts. Such additives may be added for the functioning of the heat absorbing member, when the aircraft is cruising on high altitudes, leading to a decrease of atmospheric pressure.

The heat absorbing material can generate pressure inside the shell when transitioning from the initial state of matter to its final state of matter.

The shell of the heat absorbing member can be configured to release the heat absorbing material when the pressure inside the heat absorbing member exceeds a predetermined threshold.

A valve or a predetermined breaking point in the shell might be foreseen for that purpose. It might be sufficient that only a portion of the heat absorbing material has changed its state of matter before the heat absorbing member releases the heat absorbing material. Only one condition needs to be fulfilled, namely that the pressure inside the heat absorbing member, to be more precise inside the hermetically sealed shell, exceeds a predetermined value.

The heat absorbing member may be composed of a plurality of heat absorbing sub members, such as pockets. Each of the plurality of sub members comprises a shell that is hermetically enclosing a heat absorbing material with the properties outlined before.

The heat absorbing member can be in a shape of a pouch having for example a rectangular shape. The width of the pouch can be configured such that it approximately matches the length of the elongated surface of the plurality of cell tubes.

The heat absorbing member can be flexible, such that it is possible to bend around the plurality of cell tubes. Alternatively, the heat absorbing member might be stiff in a preconfigured shape, such that it can be placed between the cell tubes without the need of bending it before placing between the plurality of cell tubes.

The heat absorbing member can preferably be placed between the plurality of cell tubes such that it surrounds each of the plurality of cell tubes at least party. It is important that each of the cell tubes is at least partly surrounded by the heat absorbing member, to reduce or avoid a flow of heat to adjacent cell tubes in case of a thermal event in one cell tube. Alternatively, or in addition, the plurality cell tubes can be enclosed by the heat absorbing member.

In addition, the heat absorbing member can extend along the entire length of the elongated surface of the plurality of cell tubes, when the width of the heat absorbing member is configured to match the length of the elongated surface. This is advantageous as the heat absorbing member reduces or avoids a flow of heat along the entire length of the elongated surface of the plurality of cell tubes and might be heated evenly along the entire width.

The battery module can comprise a first plate. The first plate can be configured with a plurality of openings and a plurality of vent holes and can support each of the plurality of cell tubes at one end. This end is preferably the end where the anode of one battery cell is located. The first plate can be configured to electrically connect to one pole of one battery cell via a wire bonding or any other means suitable to arrange an electrical connection between the first plate and one pole, preferably the anode, of one battery cell.

The first plate can be configured as a PCB (printed circuit board), to transport the currents generated by the different cells of the module, and to distribute control and measurement signals between the cells and other devices, which can be located inside the battery module, such as control electronics. The cells can be wire bonded with tracks of the PCB.

The first plate can be arranged between one end of the plurality of cell tubes and the housing and may have a lower and upper surface, whereas the upper surface may face away from one end of the plurality of cell tubes.

The battery module can also include a second plate. The second plate can be arranged between an other end of the plurality of cell tubes and the housing. The said other end is preferably the end where the cathode of one battery cell is located inside the cell tube.

The second plate can be configured with a plurality of openings and a plurality of vent holes and can be configured to support each of the plurality of cell tubes at one end.

The second plate can be made of a non-conductive material such as a reinforced epoxy laminate material. Alternatively, or in addition, the second plate can be configured to be electrically conductive for interconnecting the poles of the plurality of battery cells and/or connecting the cathode to electronic devices inside the battery module and/or for connecting to a device that is external to the battery module.

The housing can be configured with a plurality of vent holes to allow an air flow through the housing, to cool the plurality of cell tubes, the plurality of battery cells housed in the plurality of cell tubes and the heat absorbing member each are comprised in the housing.

The housing may have vent holes.

The housing may have a plurality of openings.

The housing can be assembled of multiple parts, such as a lower part and an upper part. Each of the parts may have vent holes and a plurality of openings.

The housing can be configured such that the air flow through the housing does not enter the plurality of cell tubes and/or does not get into contact with the upper surface of the first plate, which is arranged between one end of the cell tubes and an inner surface of the housing.

This feature prevents cooling air from the outside, which might be humid and/or contains dust, to reach the battery cells and/or electronic components mounted onto the first plate, thus reducing the risk of damaging the battery cells and/or components with humidity or dust.

This feature also avoids the colling air flow to be mixed with fumes generated by one battery cell in case of a thermal event.

The fumes may never reach other healthy battery cells, as the cell tubes provide a sufficient barrier and guide the fumes such that they may spread across the battery module. The particles contained in the fume may also not reach the first or second surface of the first plate and short circuits are prevented when the first plate, for instance, is configured as a PCB.

On the other hand the air flow can continue to cool the plurality of cell tubes, the plurality of battery cells housed in the cell tubes and the heat absorbing member.

The housing and the first plate can be configured to release the flames and fumes generated by one battery cell during a thermal event via one of the plurality of holes. The plurality of holes may be aligned with one end of the plurality of cell tubes, such that the holes are be placed above one end of the cell tubes. It needs to be noted that said holes are not to be confused with vent holes comprised in the housing.

The holes comprised in the housing and the first plate may be connected using fluid connections. The fluid connections can be provided by tubes made of a heat-resistant non-metallic material, such as ceramic, a composite glass fibre, or the like. The fluid connection might be fluid-tight. Flames and fumes generated by one battery cell in a thermal event are guided by the corresponding fluid connection. Flames and fumes may never get into contact with a top or bottom surface of the first plate.

Alternatively or in addition, the fluid connections can be provided by protutions extending from the housing towards the holes in the first plate.

Alternatively or in addition, the fluid connections might be provided by the spacers or the cell tubes that are extended in their length, such that they get into contact with the holes comprised in the housing.

The holes contained in the housing can be covered with a material during normal operation such that an air flow is prevented from entering the holes during normal operation.

The material covering the holes in the housing can be a material, such as an adhesive or a valve, that will be removed or open when the pressure inside the housing exceeds a threshold.

The material covering the holes in the housing can be a material, such as a fusible material, that will be melted, burned or destroyed during a thermal event, such that fire and fumes can exit the battery module through the uncovered hole. Any material suitable to be melted, burned, broken or opened might be used for this purpose. The material acts as a predetermined breaking point in a thermal event.

The air flow through the housing can exit the housing through the vent holes in the first plate and the vent holes in the housing, defining an exit path.

In a case where the heat absorbing member releases the heat absorbing material contained in the heat absorbing member during a thermal event, the air can flow through the housing and forces the heat absorbing material to exit through the vent holes forming an exit path.

As disclosed previously, the released heat absorbing material may not enter the plurality of cell tubes nor contact the upper surface of the first plate. This feature is also important, due to the reasons as outlined before.

The housing can be configured with a plurality of fluid connectors, such as tubes, connecting the plurality of vent holes in the housing to the plurality of vent holes comprised in the first plate.

The connection might be leakproof, such that the air flow is forced to exit through the fluid connectors without getting into contact with one surface of the first plate.

The plurality of fluid connectors can be provided by a plurality of protrusions forming an integral part of the housing and extending from an inner surface of the housing into the direction of the first plate.

Other means such as tubes being in contact with the inner surface of the housing and the first plate may be used instead to arrange the fluid connection.

The housing can also be arranged to connect the plurality of vent holes comprised in the second plate with a plurality of vent holes in the housing using the fluid connectors as disclosed before.

The housing of the battery module can be arranged in an elongated shape, such as a shape of a rectangular cuboid or an elongated cylinder and can have an elongated face.

A plurality of vent holes can be distributed over the elongated face for allowing an air flow entering the housing to cool the plurality of cell tubes and the heat absorbing member. The air flow may exit through the plurality of vent holes in the first plate which may be fluidly connected to further vent holes comprised in the housing.

Alternatively, or in addition, the air flow may enter through the plurality of vent holes in the second plate and exit through the vent holes comprised in the first plate.

The air flow entering through the plurality of vent holes in the housing, flowing through the housing for cooling the plurality of cell tubes and the heat absorbing member and leaving through the first plate may be provided and forced by an air management of the vehicle, preferably an aircraft. Alternatively, or in addition, by a fan attached to an outer surface of the housing. In any of the cases may the air flow be provided by a device that is external to the battery module.

The battery module might be configured alternatively or in addition with a heat exchanger for cooling the battery cells, cell tubes and the heat absorbing member. The heat exchanger might be placed inside the battery module, preferably close to the plurality of cell tubes and the heat absorbing member for cooling. The heat exchanger can comprise a material with high heat conductivity, such as metal. Water or another suitable cooling fluid might pass through the heat exchanger.

The heat exchanger can be connected to a plurality of connection pipes carrying the cooling fluid, entering the battery module via the vent holes comprised in a bottom section of the housing and exiting the battery module via the vent holes in a top section of the housing. The pipes for connecting the heat exchanger can be flexible or stiff and can be connected to a fluid cooling circuit external to the battery module.

Pipes may be provided for connecting the heat exchanger. Alternatively, the heat exchanger can be configured as pipes only. In this case the pipes might be made of a material with high thermal conductivity, such as metal. The pipes can simply be pushed through the vent holes in the housing and connected to an external cooling circuit.

Special attention needs to be drawn to the tightness of the liquid cooling system when the battery module is provided with a liquid cooling circuit, as a leakage might cause short circuits inside the battery module. But due to the internal structure of the battery modules, particularly due to the cell tubes enclosing the battery cells, the spacers and the fluid connectors connecting the vent holes might a leaked less significant since water is prevented from getting into contact with the battery cells.

A sensor might be foreseen to detect water ingress. When the sensor detects a water ingress, the battery module might be disconnected and isolated from the vehicles electrical power supply system.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

System Overview

Figure 1A:
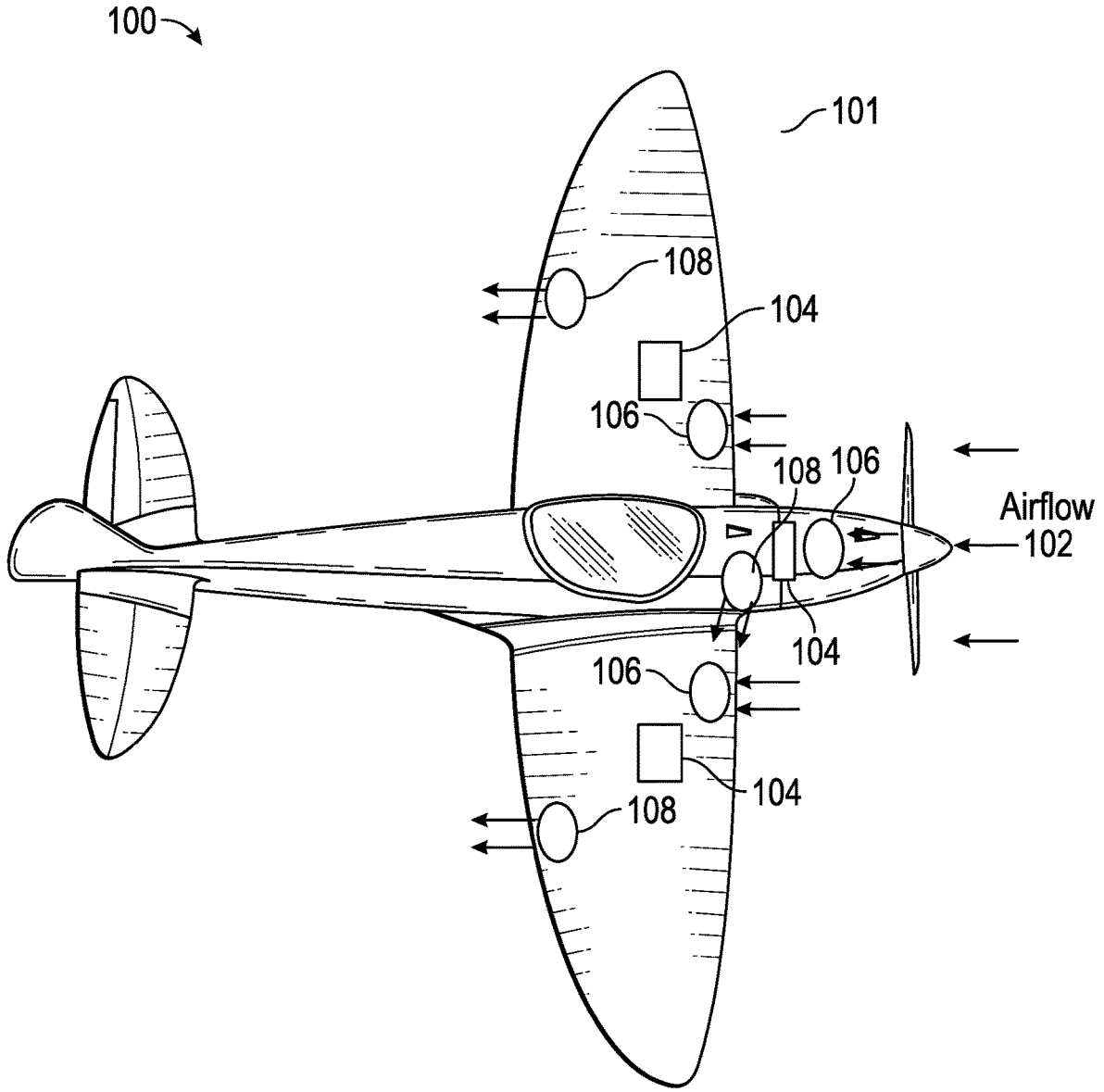
FIG. 1A illustrates an example aircraft, such as an electric or hybrid aircraft.
Figure 1B:
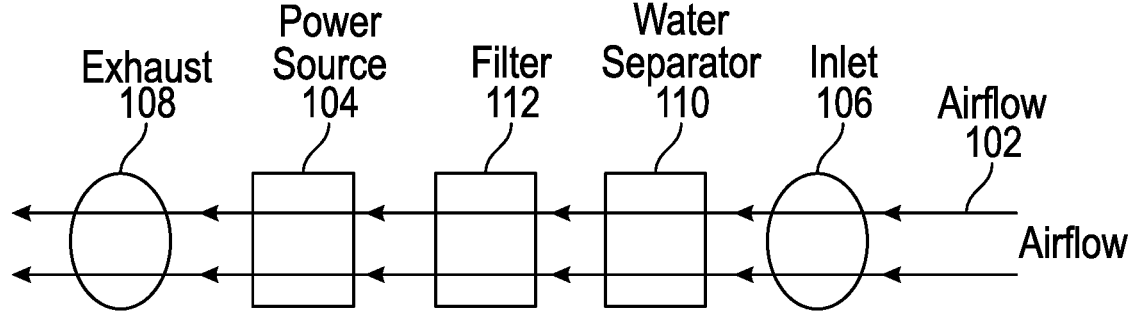
FIG. 1B illustrates air flow through the aircraft of FIG. 1A.

FIG. 1A illustrates an aircraft 100, such as an electric or hybrid aircraft, and FIG. 1B illustrates air flow 102 through the aircraft 100. The aircraft 100 has an aircraft housing 101. The aircraft can include power sources 104, inlets 106, exhausts 108, one or more water separators 110, and one or more filters 112. The inlets 106 can include inlet ports proximate to an exterior of the aircraft 100 and inlet channels extending from the inlet ports into the aircraft 100. The exhausts 108 can include exhaust ports proximate to the exterior of the aircraft 100 and exhaust channels extending from the exhaust ports into the aircraft 100.

During operation of the aircraft 100 or when the power sources 104 may be supplying power, the air flow 102 can flow into the aircraft 100 from one of the inlets 106 (which can be locations of relatively higher pressure), pass in or around one or more of the power sources 104, and next pass out one of the exhausts 108 (which can be locations of relatively lower pressure). The air flow 102 can cool the one or more the power sources 104 or facilitate expulsion of heat or combustion components from the aircraft 100 in the event of a fire at the one or more of the power sources 104. The air of the air flow 102 can be filtered (for example, by one of the filters 112) as the air passes through the aircraft 100. Water or other impurities may be removed from the air (for example, by one of the one or more water separators 110) as the air flow 102 passes through the aircraft 100.

As described herein, the aircraft 100 can include an electric power system that includes integrated fire relief channels so that heat created by a fire or explosion of one of the power sources, such as the power sources 104, may diverted through an exhaust channel to an exhaust, such as an exhaust port of the exhausts 108.

The aircraft 100 can include one or more components or features of aircrafts disclosed in (i) U.S. Pat. No. 10,131,246, issued Nov. 20, 2018, titled "COMMUNICATION SYSTEM FOR BATTERY MANAGEMENT SYSTEMS IN ELECTRIC OR HYBRID VEHICLES," (ii) U.S. Pat. No. 10,322,824, issued Jun. 18, 2019, titled "CONSTRUCTION AND OPERATION OF ELECTRIC OR HYBRID AIRCRAFT," the entire disclosures of which are hereby incorporated by reference.

Figure 1C:
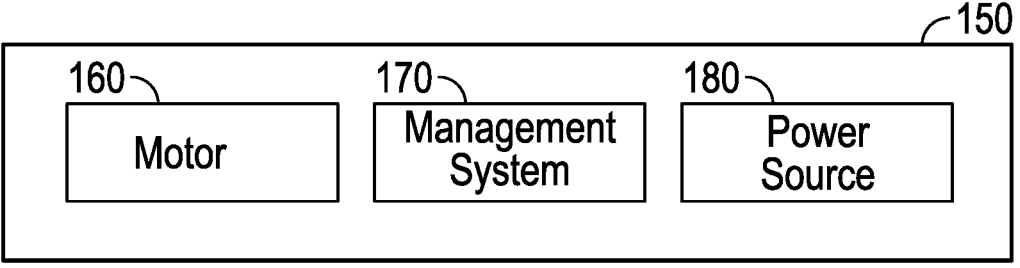
FIG. 1C illustrates a simplified block diagram of the aircraft of FIG. 1A.

FIG. 1C illustrates a simplified block diagram of an aircraft 150, which can be an implementation of the aircraft 100 of FIG. 1A. The aircraft 150 includes a motor 160, a management system 170, and a power source 180. The power source 180 can be an implementation of one or more of the power sources 104. The motor 160 can be used to propel the aircraft 150 and cause the aircraft 150 to fly and navigate. The management system 170 can control and monitor the components of the aircraft 150, such as the motor 160 and the power source 180. The power source 180 can power the motor 160 to drive the aircraft 150 and power the management system 170 to enable operations of the management system 170. The management system 170 can include one or more controllers as well as other electronic circuitry for controlling and monitoring the components of the aircraft 150.

The motor 160 can be or include an electrical motor, such as a DC motor, a one phase AC motor, or a three phase AC motor. The motor 160 can include an electric brushless motor. The motor 160 can include more than one motor. The motor 160 can move the aircraft 150 and drive a (thrust-generating) propeller or a (lift-generating) rotor. The motor 160 can function as a generator. The motor 160 can include multiple motors, such as electric motors. The aircraft 150 can include one or a plurality of electric motors and, optionally, one or a plurality of thermic motors, and function as a pure electric airplane or as a hybrid airplane.

The power source 180 can store electrical energy and include one or more battery modules that each include one or more battery cells. The battery cells of a battery module may be electrically connected in series and/or parallel with one another to deliver a desired voltage and current from the battery module. Two or more battery modules can be electrically connected in series and/or in parallel to form a battery pack and deliver a desired voltage and current from the two or more battery modules. The aircraft can comprise two or more battery packs as power source. The battery cells can be lithium-ion (Li-Ion) battery cells or lithium-polymer (Li—Po) battery cells.

Figure 2:
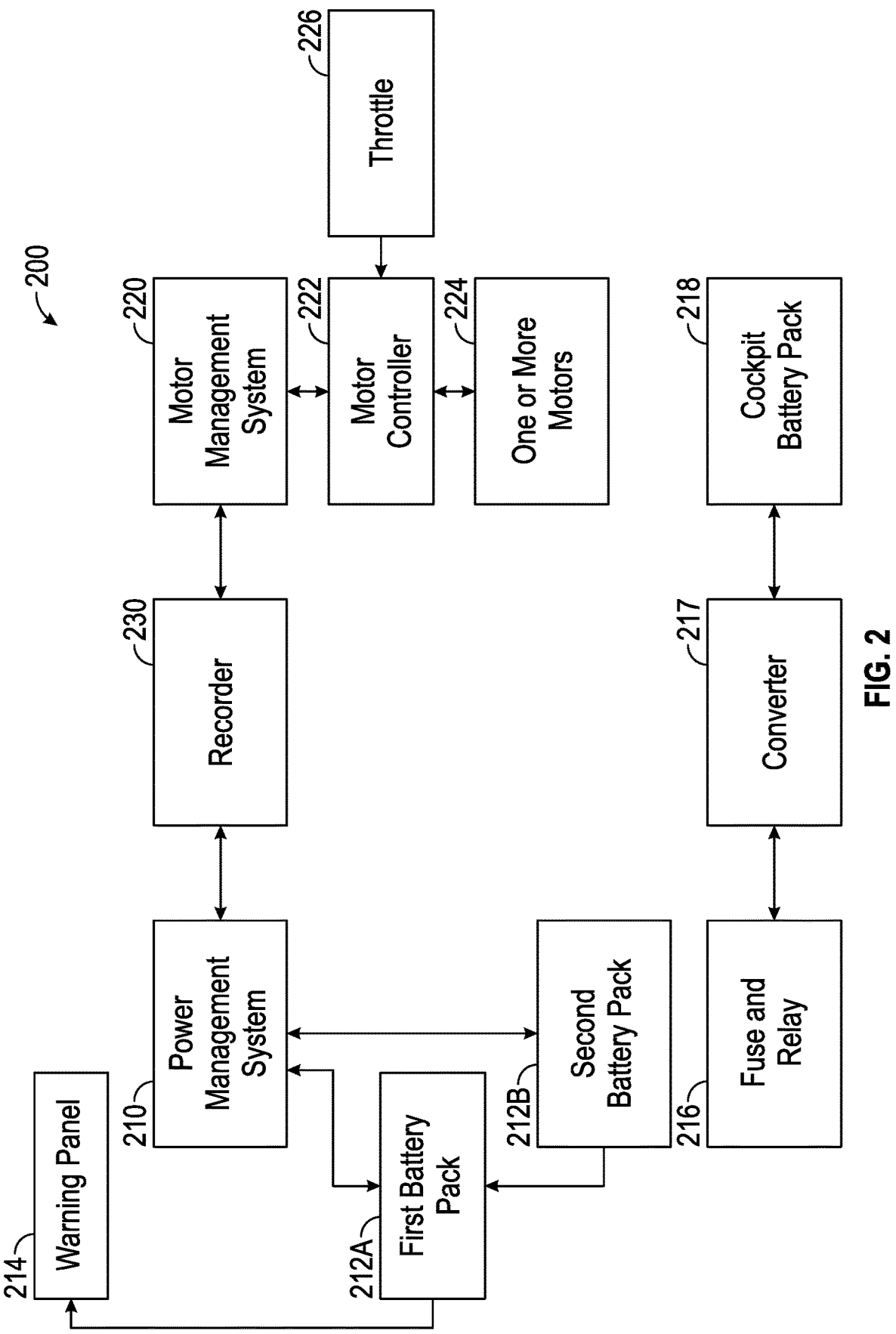
FIG. 2 illustrates an example operation system for an aircraft, such as the aircraft of FIG. 1A.

FIG. 2 illustrates an operation system 200 of an aircraft, such as the aircraft 100 of FIGS. 1A, 1B, and 1C. The operation system 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226. The one or more motors 224 can be an implementation of the motor 160, the first battery pack 212A and the second battery pack 212B can be an implementation of the power sources 104 or the power source 180, and the remaining components can be an implementation of the management system 170.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B. Features around construction and operation of the power management system 210 are described in greater detail in U.S. Pat. No. 10,131,246, issued Nov. 20, 2018, titled "COMMUNICATION SYSTEM FOR BATTERY MANAGEMENT SYSTEMS IN ELECTRIC OR HYBRID VEHICLES," which is incorporated herein by reference.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218. The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller 222 may further operate according to instructions from the throttle 226 that may be controlled by a pilot of the aircraft.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 may include the same or similar computer hardware, or a single hardware may perform both functions.

Power and Fire Management Systems

Figure 3A:
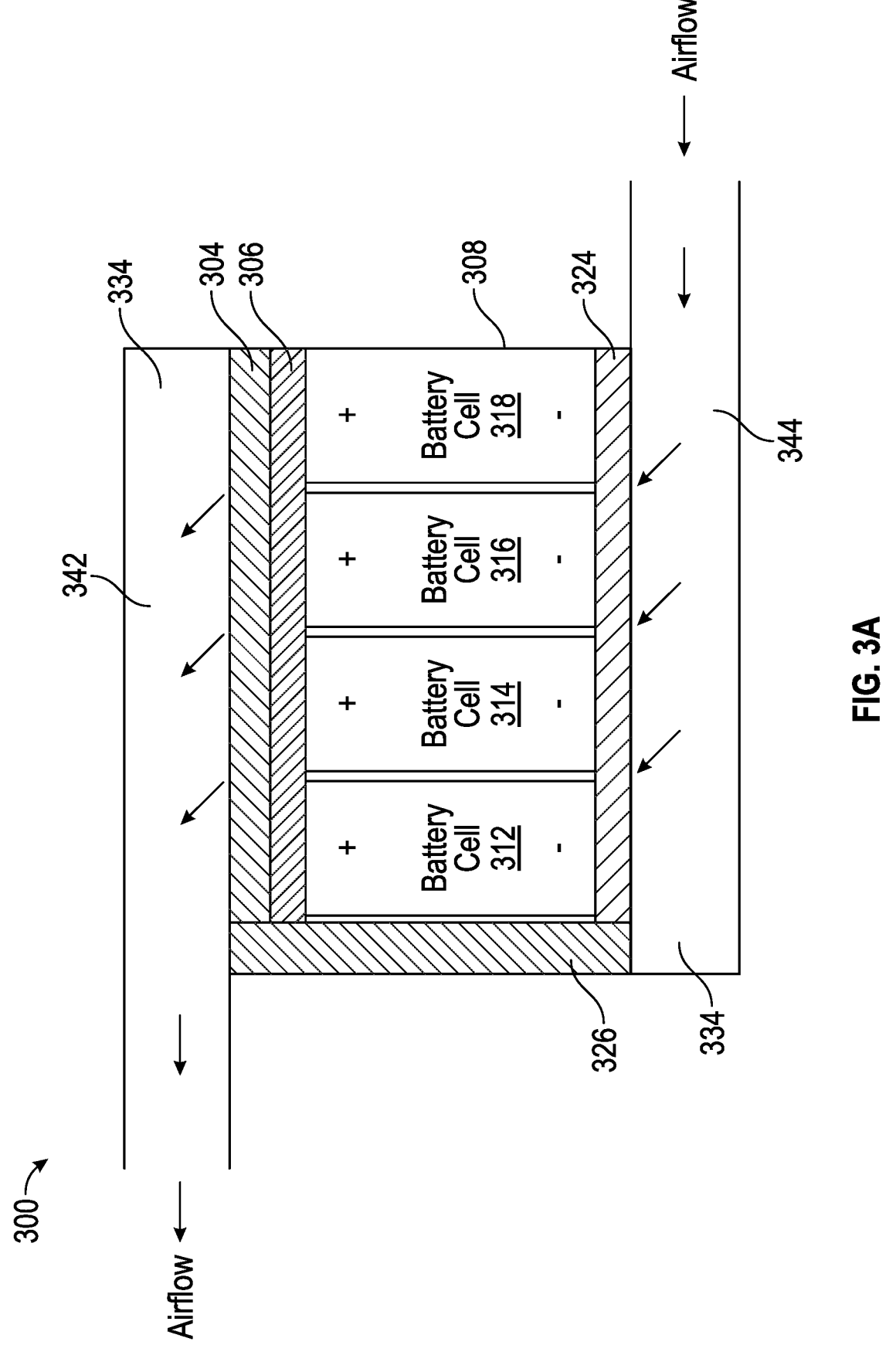
FIGS. 3A and 3B illustrate an example power system usable in a vehicle, such as the aircraft of FIG. 1A.

FIG. 3A illustrates a power system 300 usable in a vehicle, such as the aircraft 100, and prior to a fire. The power system 300 includes an exhaust channel 342, an inlet channel 344, and a battery module 350. The battery module includes a battery housing 308 that supports battery cells 312, 314, 316, and 318. The exhaust channel 342 can be coupled or positioned proximate to the battery housing to prevent a fire in one of the battery cells 312, 314, 316, or 318 from spreading to another of the battery cells 312, 314, 316, or 318. One or a plurality of battery modules 350 with battery housings 308 and the associated battery cells 312, 314, 316, and 318 can together form a battery pack and be part of a power source for the vehicle, such as the power source 180.

The battery housing 308 can support a first conductive plate 306 (top plate or first plate), an optional insulative material 304, and the battery cells 312, 314, 316, and 318. The battery housing 308 can at least partially surround the top plate 306, the insulative material 304, and the battery cells 312, 314, 316, and 318. The battery housing 308 can be formed of or include plastic and can have an outer shape substantially shaped as a rectangular prism or cube. The battery housing 308 can support one or more additional battery cells (not shown) within the battery housing 308 and alongside the battery cells 312, 314, 316, and 318 so that the battery housing 308 may support 8, 9, 10, 12, 16, or more battery cells, for example.

The conductive top plate 306, the optional insulative material 304, and the battery cells 312, 314, 316, and 318 can be layered so that the top plate 306 (or at least a portion thereof) may be positioned between the insulative material 304 and the battery cells 312, 314, 316, and 318. In addition or alternatively, the insulative material 304 (or at least a portion thereof) can be positioned between the top plate 306 and the battery housing 308.

The top plate 306 can electrically connect all battery cells 312, 314, 316, and 318 in the battery module 350. As illustrated in FIG. 3A, the battery cells 312, 314, 316, and 318 can be oriented in the same direction such that the top plate 306 contacts or electrically connects to positive terminals of the battery cells 312, 314, 316, and 318, thereby electrically connecting the battery cells 312, 314, 316, and 318 in parallel with one another. In other implementations, the top plate 306 can contact a negative terminal of the battery cells 312, 314, 316, and 318, or one or more of the battery cells 312, 314, 316, or 318 can be oriented in an opposite direction from another of the battery cells 312, 314, 316, or 318.

Although not illustrated in FIG. 3A, multiple of the top plates 306 can be provided. For example, multiple conductive bars as top plates can each be arranged for electrically connecting a subset of the battery cells 312, 314, 316, and 318. As the multiple conductive bars may cover a smaller surface area than the top plate 306, a weight of the power system 300 can be reduced by use of the multiple conductive bars.

The top plate 306 can be electrically conductive and composed of one or more conductive materials. For example, the top plate 306 can include copper, aluminum, steel, silver, gold, zinc, nickel, iron, platinum, or a combination thereof. In other implementations, the top plate 306 may not be conductive. The top plate 306 or at least portions thereof can withstand the temperature of a fire of one of the battery cells 312, 314, 316, and 318 so that a fire from one does not burn through the top plate 306 or the at least portions thereof. The top plate 306 may allow the fire of one of the battery cells 312, 314, 316, and 318 to pass through the top plate 306 (such as through a hole in or on the top plate 306) so that the fire is directed to the exhaust channel 342 but does not reach the other of the battery cells 312, 314, 316, and 318.

The battery housing 308 can support a second conductive plate 324 (also referred to as a base plate) that may electrically connect negative terminals (sometimes referred to as anodes) of the battery cells 312, 314, 316, and 318. The base plate 324 can be electrically conductive and composed of one or more conductive materials, which may be similar to or the same as the top plate 306. In other implementations, the base plate 324 may not be conductive.

The base plate 324 may allow the fire of one of the battery cells 312, 314, 316, and 318 to pass through the base plate 324 (such as through a hole in or on the base plate 324) so that the fire does not reach the other of the battery cells 312, 314, 316, and 318.

As with the top plate 306, multiple of the base plates 324 can be provided although not illustrated in FIG. 3A. For example, multiple conductive bars as base plates can each be arranged for electrically connecting a subset of the battery cells 312, 314, 316, and 318. As the multiple conductive bars may cover a smaller surface area than the base plate 324, a weight of the power system 300 can be reduced by use of the multiple conductive bars. The battery housing 308 can support a housing circuit board assembly 326. The housing circuit board assembly 326 can control the transfer of power from or to the battery cells 312, 314, 316, or 318, as well as include one or more sensors for monitoring a voltage, a temperature, or an internal pressure of the battery cells 312, 314, 316, or 318 or another associated characteristic. The housing circuit board assembly 326 can provide galvanic isolation with respect to other components. Although the housing circuit board assembly 326 is illustrated on a side of the battery housing 308, the housing circuit board assembly 326 can be located or positioned elsewhere in, on, or proximate to the battery housing 308, such as one or more of its bottom or another side. The housing circuit board assembly 326 can be within or out of the path of a potential fire from the battery cells 312, 314, 316, and 318. The housing circuit board assembly 326 may be a thermal isolator. As will be described, an additional circuit board can provided, for example as part of the top plate 306. Multiple circuit boards can be mutually connected with electric connectors.

The battery cells 312, 314, 316, and 318 can store electrical energy. The electrical energy can be utilized for driving one or more motors, such as the motor 160. The one or more motors can propel a vehicle housing that is configured to fly. The battery cells 312, 314, 316, and 318 can be used to additionally or alternatively power other components supported by the vehicle housing.

The battery cells 312, 314, 316, and 318 can electrically be connected in series and/or in parallel to deliver a desired voltage and current. One or more of the battery cells 312, 314, 316, and 318 can be Li-Ion or Li—Po battery cells. The battery cells 312, 314, 316, and 318 can be substantially shaped as a cylinder.

The insulative material 304 can be fire retardant or not heat conductive. As illustrated, the insulative material 304 can be on top of the top plate 306 and prevent a fire from leaving the exhaust channel 342. For example, if one of battery cells 312, 314, 316, and 318 combusts and causes a fire, the fire can pass or burn through the top plate 306 or the insulative material 304 on its way into the exhaust channel 342, and after the fire enters the exhaust channel 342, the top plate 306 and the insulative material 304 can prevent the fire from leaving the exhaust channel 342 and reaching the other of the battery cells 312, 314, 316, and 318. The insulative material 304 may not be included in the battery module 350 in certain embodiments.

The top plate 306 and/or the insulative material 304 can include one or more holes or valves, such as one hole or valve above each of the battery cells 312, 314, 316, and 318, to permit the fire to pass through to the exhaust channel 342 but not pass back into one of the other holes or valves and into another of the battery cells 312, 314, 316, and 318. The top plate 306 or the insulative material 304 can include one or more holes or valves for allowing air to flow through the power system 300. For example, air can flow in through the inlet channel 344, pass through the battery housing 308 (for instance, around the battery cells 312, 314, 316, and 318 or from their negative to positive terminals), around or through the top plate 306 (for instance, such as through one or more holes therein) or the insulative material 304 (for instance, such as through one or more holes therein), and flow out through the exhaust channel 342. The top plate 306 and/or the insulative material 304 can additionally or alternatively include one or more separate regions of lower integrity (such as above each of the battery cells 312, 314, 316, and 318 and that may be prone to weakening by a fire) and higher integrity (such as not above each of the battery cells 312, 314, 316, and 318 and that may not be prone to weakening by a fire) so that a fire may weaken one region of lower integrity and then pass through the weakened region to the exhaust channel 342 but not burn through one or more other regions of lower or higher integrity and pass into another of the battery cells 312, 314, 316, and 318. The top plate 306 and/or the insulative material 304 can include at least some holes (for example, so that air can pass from the inlet channel 344 to the exhaust channel 342, or from the exhaust channel 342 to the inlet channel 344) and include at least some regions of lower integrity (for example, so that fire or air may pass through the top plate 306 or the insulative material 304 and exhaust through the exhaust channel 342 or the inlet channel 344).

Figure 3B:
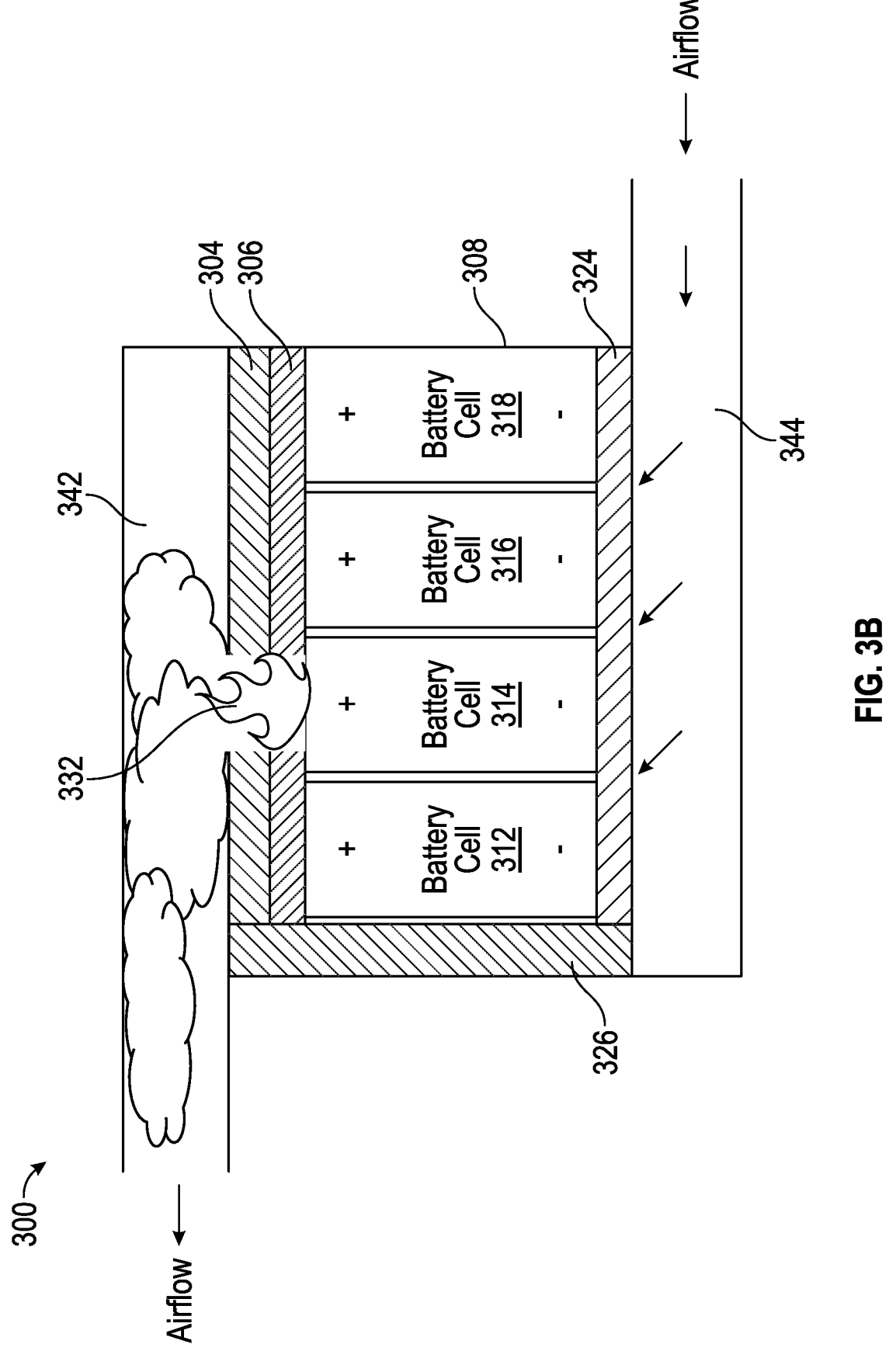

The exhaust channel 342 or the inlet channel 344 can include an at least partially enclosed space 334. As illustrated by FIG. 3B, after a fire 332 in one battery cell, such as the battery cell 314, the at least partially enclosed space 334 can transfer combustion products, fumes, smoke, heat, or steam from the fire 332 toward or to an exhaust port of the vehicle housing, such as one of the exhausts 108. As illustrated, to facilitate the evacuation of the combustion products, fumes, smoke, heat, steam, or air through the exhaust channel 342, air can be funneled through the aircraft. For example, air from outside of the aircraft (for instance, in front of the aircraft) can enter through the inlet channel 344, pass at least partially around one or more of the battery cells 312, 314, 316, or 318, and exit through the exhaust channel 342 (for instance, behind the aircraft, such as behind a wing). A configuration such as this can create a vacuum for air flow, for example, where the air enters through a higher pressure inlet (for instance, the inlet channel 344) and exits through a lower pressure outlet (for instance, the exhaust channel 342). The low pressure of the exhaust channel 342 can facilitate the flow of air through the power system 300, in that the lower pressure serves to suck the air or combustion components from the exhaust channel outside of the aircraft. The power system 300 can, in some implementations, include the inlet channel 344 or the exhaust channel 342 but may not include both. The power system 300 can include a fan or other air circulating device (not shown) to facilitate the evacuation of the combustion products, fumes, smoke, heat, steam, or air through the exhaust channel 342 or into the inlet channel 344.

During normal operation, air from the inlet channel 344 can flow between the battery cells 312, 314, 316, or 318 and cool the battery cells 312, 314, 316, or 318 in the battery module 350.

The battery housing 308 (as well as a vehicle housing in which the battery housing 308 may be positioned) can permit an air flow through the battery housing 308 during operation of the vehicle so that air may tend to flow from negative terminals of the battery cells 312, 314, 316, and 318 to the positive terminals. This may help to facilitate a flow of the combustion products, fumes, smoke, heat, or steam from the battery cells 312, 314, 316, and 318 into the exhaust channel 342 and towards or to one or more exhaust ports. Air flow through the battery housing 308 may additionally or alternatively cool the battery cells 312, 314, 316, or 318 as it flows through the battery housing 308. Accordingly, air flow through the power system 300 may have a dual purpose of cooling the battery cells 312, 314, 316, and 318 and facilitating the exhaust of combustion products, fumes, smoke, heat, or steam if one or more of the battery cells 312, 314, 316, and 318 catch fire. This dual purpose may be desirably performed without the additional weight of include two different systems for the purposes of cooling the battery cells 312, 314, 316, and 318 and facilitating the exhaust of combustion products, fumes, smoke, heat, or steam if one or more of the battery cells 312, 314, 316, and 318 catch fire.

Figure 3C:
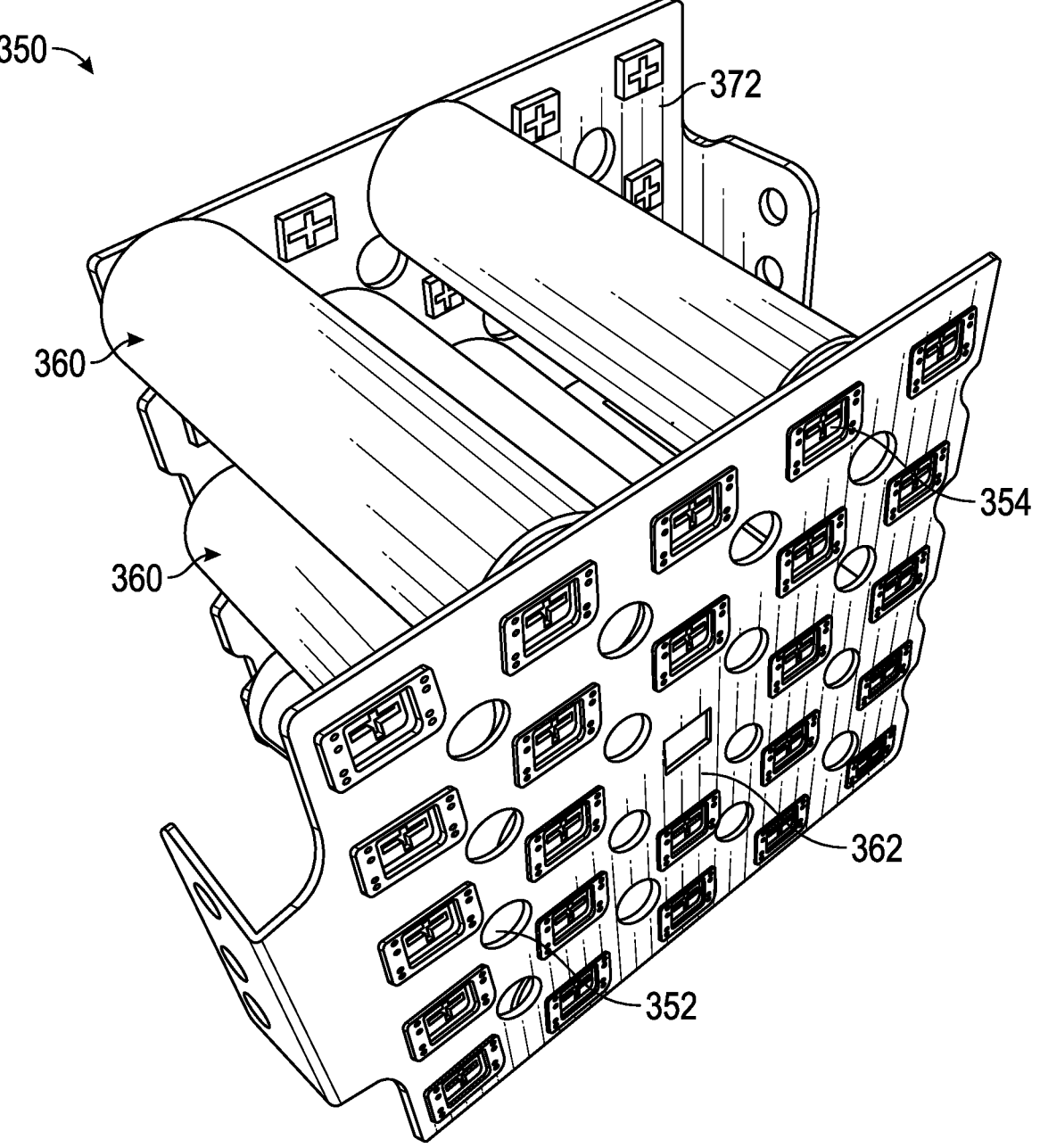
FIG. 3C illustrates example components of a power system, such as the power system of FIGS. 3A and 3B.

FIG. 3C illustrates example components of an embodiment of the battery module 350. As shown, battery cells 360 can be positioned proximate to a top plate 362 (also referred to as conductive plate). The top plate 362 can include air outlets 352 (for instance, holes) that are positioned along spaces between the battery cells 360. The air outlets 352 can permit air to pass by the battery cells 360 as described herein. On an opposite side of the battery cells 360 from the top plate 362, a bottom plate 372 (also referred to as base plate or second plate) can be positioned proximate to the battery cells 360 and can be the same as or similar to the top plate 362.

Furthermore, the top plate 362 can include, or be coupled to, one or more regions of lower integrity (such as a first region of lower integrity 354), and individual regions of lower integrity may be separated from other regions of lower integrity by regions of higher integrity. The one or more regions of lower integrity can be located throughout the top plate 362, and may be positioned above the battery cells 312, 314, 316, or 318, above spaces between the battery cells, or a combination thereof. The regions of lower integrity can include a tab configured to be shifted away from a battery cell, should the battery cell explode or catch fire. The tab can include nickel, copper, or aluminum.

Figure 4:
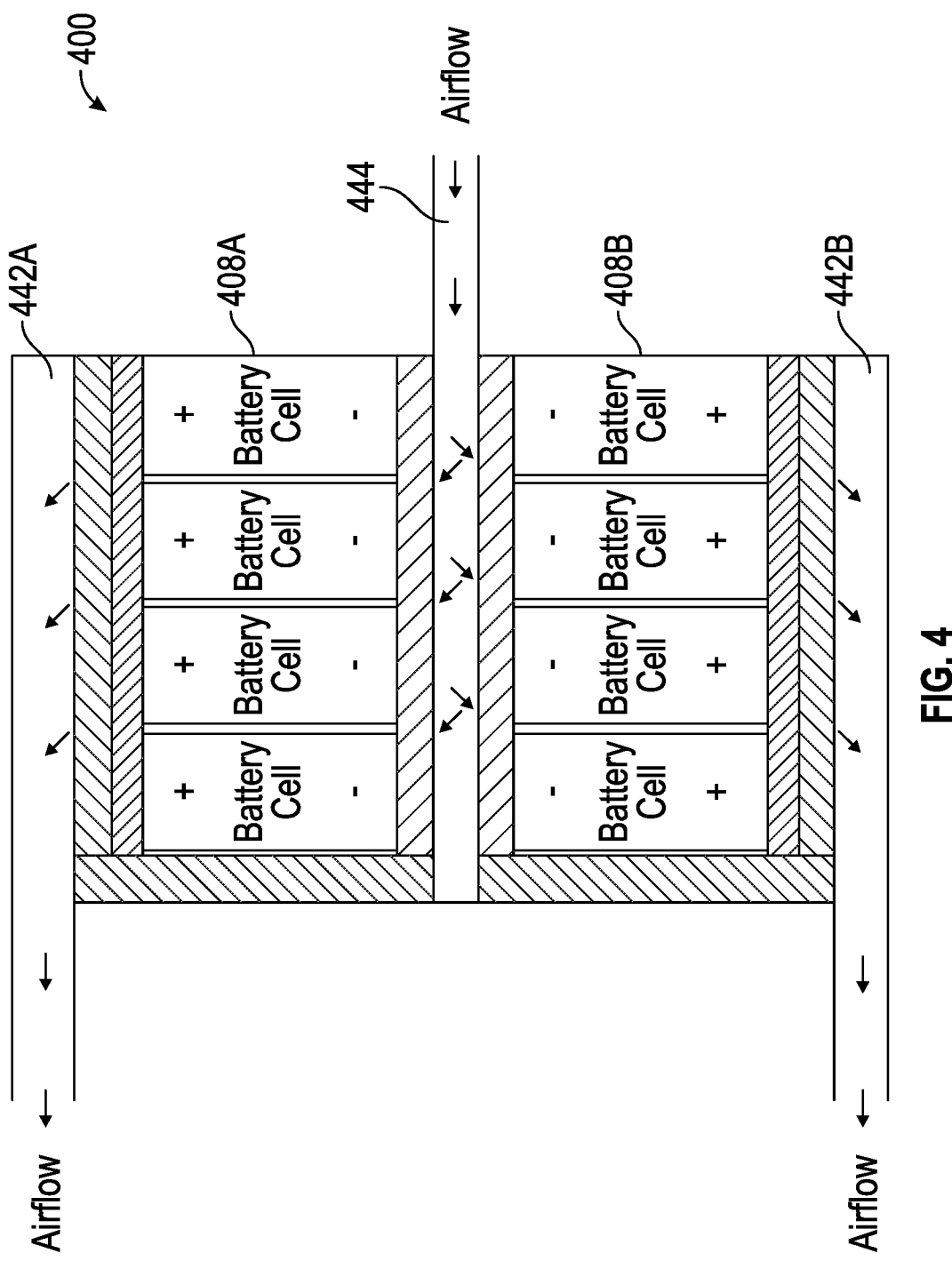
FIGS. 4 and 5 illustrate additional example power systems usable in a vehicle, such as the aircraft of FIG. 1A.

FIG. 4 illustrates a power system 400 usable in a vehicle, such as the aircraft 100. The power system 400 can be similar to the power system 300 but may include two battery modules 350 in two battery housings (a first battery housing 408A and a second battery housing 408B) rather than a single battery module 350 in one battery housing (the battery housing 308) and may include two exhaust channels (a first exhaust channel 442A and a second exhaust channel 442B) rather than a single exhaust channel (the exhaust channel 342). The power system 400 may include one or more inlet channels 444 (for instance, similar to inlet channel 344) into which air can flow, such as from outside of the aircraft. The first battery housing 408A and the second battery housing 408B can each be similar to or the same as the battery housing 308 and may, although not illustrated, be physically connected to one another. The first exhaust channel 442A and the second exhaust channel 442B can each be similar to or the same as the exhaust channel 342 and divert combustion products, fumes, smoke, heat, or steam from a fire toward or to one or more exhaust ports of the vehicle housing, such as one of the exhausts 108. The battery cells of the first battery housing 408A and the second battery housing 408B can be electrically connected in parallel or series with one another and can together be part of a power source for the vehicle, such as one of the power sources 104 or the power source 180.

Figure 5:
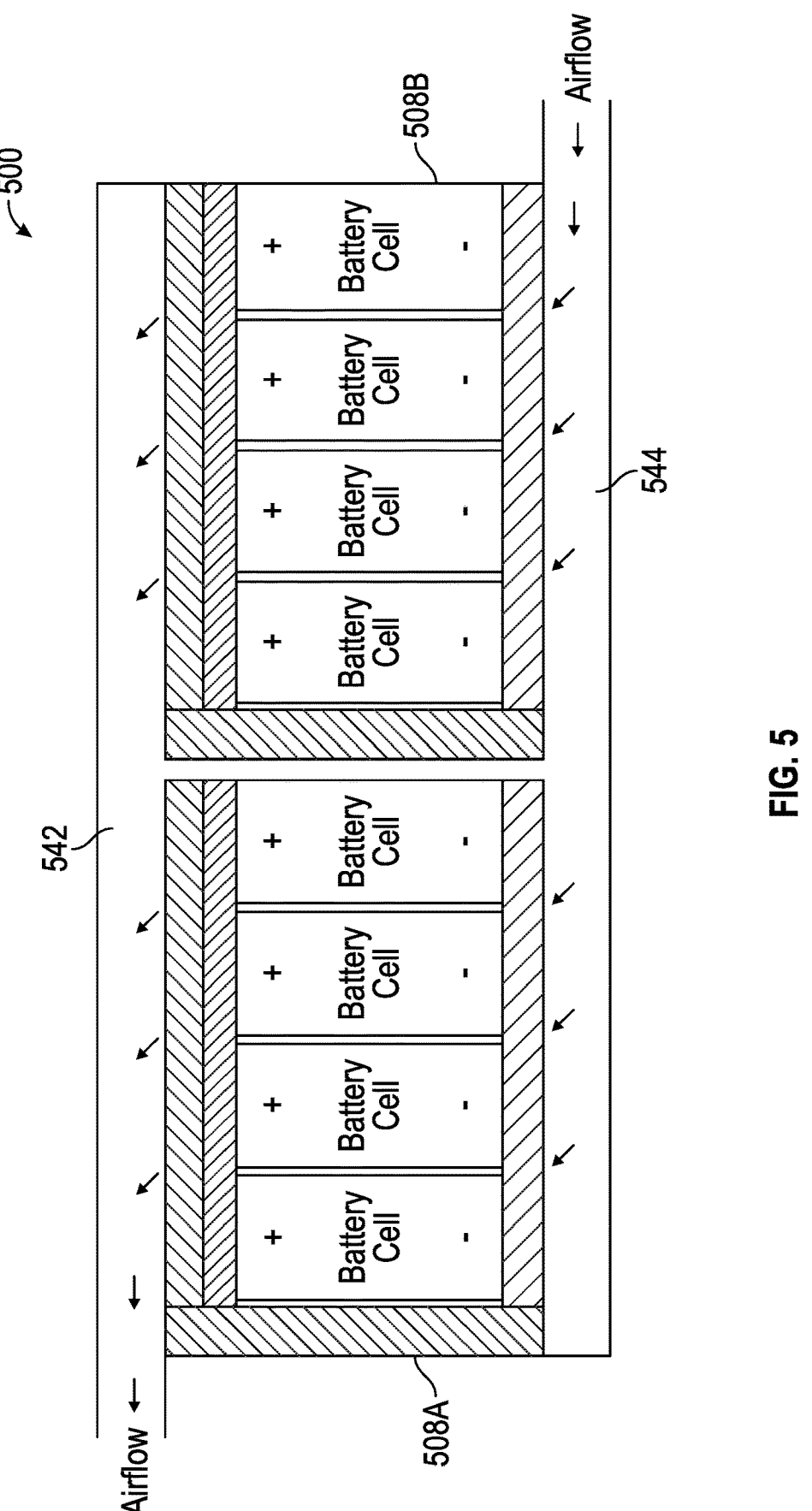

FIG. 5 illustrates a power system 500 usable in a vehicle, such as the aircraft 100. The power system 500 can be similar to the power system 300 but may include two battery modules 350 in two battery housings (a first battery housing 508A and a second battery housing 508B) rather than a single battery module 350 in a single battery housing (the battery housing 308) that may be coupled or positioned proximate to an exhaust channel 542 or an inlet channel 544. The first battery housing 508A and the second battery housing 508B can each be similar to or the same as the battery housing 308 and may, although not illustrated, be physically connected to one another. The exhaust channel 542 can be similar to or the same as the exhaust channel 342 and divert combustion products, fumes, smoke, heat, or steam from a fire 332 toward or to an exhaust port of the vehicle housing, such as one of the exhausts 108. The inlet channel 544 and exhaust channel 542, together with top plates (conductive plates) or insulative materials included in the first battery housing 508A and the second battery housing 508B, can prevent a fire in one of the battery cells included in the first battery housing 508A and the second battery housing 508B from spreading to another of the battery cells included in the first battery housing 508A and the second battery housing 508B. The battery cells of the first battery housing 508A and the second battery housing 508B can be electrically connected in parallel and/or series with one another, for example through the top plate 306 and through the base plate 324, and can together be part of a power source for the vehicle, such as one of the power sources 104 or the power source 180.

Although FIG. 4 illustrates two physically-parallel battery housings coupled or proximate to two exhaust channels, this disclosure can be extended to additional battery housings coupled or proximate to additional exhaust channels that are physically parallel with the power system 400. Although FIG. 5 illustrates two battery housings coupled or proximate to one exhaust channel, this disclosure can be extended to additional battery housings coupled or proximate to the one exhaust channel. Moreover, the features of this paragraph can be combined to construct multiple parallel or similar exhaust channels that may individually provide cooling and divert combustion products, fumes, smoke, heat, or steam from fires in multiple battery housings of any type disclosed in this document, toward or to one or more exhaust ports of the vehicle housing.

FIG. 6A to 6G illustrates example components of a battery module 800 (sometimes referred to as battery pack, or which could be part of a battery pack comprising a plurality of such battery modules). The battery module 800 can be at least a partial implementation of the power system 300 of FIGS. 3A and 3B. Features and advantages described or illustrated in relation with the battery modules 350 of FIG. 3A, 3B, 4 or 5 could be combined with the additional features and advantages described or illustrated in relation with the battery modules 800 of FIGS. 6A to 6G, unless otherwise described. Furthermore, the battery module 800 may be used in place of or alongside one or more of the battery modules 350 described with respect to FIGS. 3A, 3B, 4, and 5.

Figure 6A:
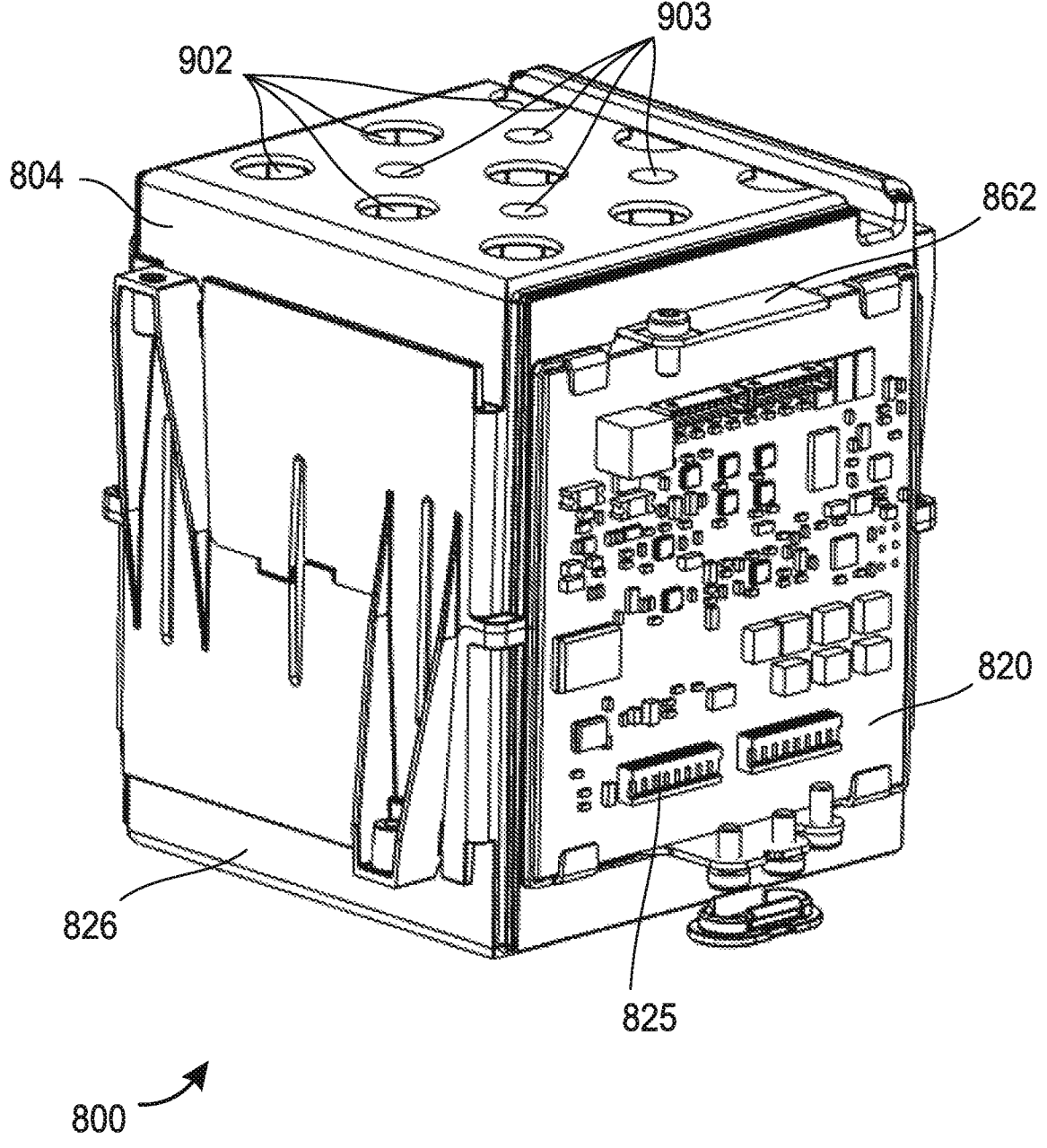
FIGS. 6A, 6B, 6C, 6D, 6E, 6F and 6G illustrate an example battery module usable in a vehicle, such as the aircraft of FIG. 1A.

FIG. 6A illustrates the battery module 800 completely assembled, while FIGS. 6B to 6G illustrate various parts or sub-assemblies of the battery module 800 with successively more sub-parts being removed to show the inner components of the battery module 800.

The battery module 800 can be constructed and disposed to facilitate a controlled expulsion of heat or combustion components from a battery cell of the battery module 800 that catches fire so that the heat or combustion components does not reach one or more other battery cells of the battery module 800 or another component of the vehicle that may be unable to withstand the heat or combustion components. The battery module 800 can desirably prevent, by thermic isolation, the transmission of heat from one overheating battery cell to another battery cell of the battery module 800 or of another battery module, which may avoid a chain reaction of starting fires in the one or more other battery cells of the vehicle.

The battery module 800 can include a top housing 804, a top plate (also referred to as conductive plate) 862, multiple cell tubes (including cell tubes 812, 813, 814), multiple battery cells (including a battery cell 8120), multiple spacers (including spacers 863, 864, 865), a bottom plate 824 (also referred to as base plate), an additional module circuit board assembly 820, multiple sensors, multiple connectors (including a connector 825), and a bottom housing 826. Features of the corresponding components of the battery module 350 can also apply to the battery module 800, unless indicated otherwise.

The top housing 804 and the bottom housing 826 can be or include a plastic. The plastic can be flame retardant. The top housing 804 and the bottom housing 826 can be assembled together, for example by clipping or fastening to each other, and provide structural support for the other components of the battery module 800 and protect the other components of the battery module 800 from humidity or dust.

The top housing 804 and the bottom housing 826 or at least portions thereof can withstand the temperature of a fire of one of the multiple battery cells of the battery module 800 so that the fire from one does not burn through. Moreover, the top housing 804 and the bottom housing 826 can continue to provide structural support despite the fire of one of the multiple battery cells of the battery module 800.

The top housing 804 and the bottom housing 826 can together provide the battery module 800 an external shape of a rectangular prism or cube. The top housing 804 and the bottom housing 826 can have the same or similar structures such that the top housing 804 and the bottom housing 826 can be used in place of one another. The top housing 804 and the bottom housing 826 can together form a battery housing for the battery module 800.

The multiple cell tubes of the battery module 800 can include a total of nine cell tubes as illustrated. In other implementations, the battery module 800 may instead include a total of 2 N or 3 N cell tubes where N is an integer. The multiple cell tubes can be arranged in one or more rows (such as two, three, four, or more rows) and one or more columns (such as two, three, four, or more columns). At least some of each of the multiple cell tubes can have the same or similar structures so that the at least some of each of the multiple cell tubes may be used in place of one another.

The battery module 800 can include cooling plates (not shown) for distributing heat evenly between the cell tubes. The battery module 800 can include one or more thermal fuses (not shown). Individual of the thermal fuses can decouple one of the multiple cooling plates from one of the multiple cell tubes responsive to a thermal runaway, such as if a fire starts within or proximate to the one of the multiple cell tubes.

One battery cell, such as the battery cell 8120 (FIG. 6D), can be mounted into each of the battery cell tube, such as the cell tube 812. Each battery cell can be protected from mechanical shocks, heats, humidity, and other hazards by the cell tube in which it is mounted. The battery cell may be electrically isolated from the cell tube in which it is housed by a plastic film around the battery cell. A surface treatment can be applied to the inner surface and/or to the outer surface of each cell tube in order to make this surface electrically isolating and reduce the risk of short-circuit through the cell tube. The treatment can protect the cell tube, such as an aluminium cell tube, from corrosion.

Each battery cell, including the battery cell 8120, can be mounted to the top plate 862 with a top spacer, such as one of the top spacers 863, 864 or 865, accommodated in a corresponding hole, such as the hole 868, through the top plate 862. The top spacer supports the battery cell and the corresponding cell tube so that the top spacer, the corresponding hole through the top plate, the corresponding battery cell and the corresponding battery cell tube can all be positioned coaxially and fixed with respect to one other. The outer diameter of the battery cell is preferably smaller than the inner diameter of the cell tube, so that the battery cell is isolated from the walls of the cell tube with a plastic film.

The top spacers, such as the top spacers 863-865, are made of or comprises an electrically isolating, heat isolating and heat resistant material, to prevent heat from one overheating battery cell being transmitted through the top spacer to the top plate 862. The top spacer can be made of ceramic, glass-fiber or heat resistant plastic. The top spacer may comprise one part that is forced in the hole through the top plate 862, or two parts which can be screwed together. As can be seen in FIG. 6E that illustrates a cell tube, a battery cell and the top plate 862 without the top spacer, the cell tube and the battery cell may not be in direct contact with the top plate 862, and the top spacer can isolate these three components thermally and electrically from each other.

The top spacers can be shaped as a ring. Each top spacer can have an inner edge on a first side of the top spacer and an outer edge on a second side of the top spacer opposite the first side. The inner edge 8631 on the first side of the top spacer can circumferentially surround and support an outer diameter of part of the cell tube. The outer edge 8630 on the second side of the top spacer can be positioned in the hole of the top plate 862 to support the top plate 862.

Each battery cell, including the battery cell 8120, can be mounted to the bottom plate 824 with a bottom spacer, such as the bottom spacers 827 and 828, accommodated in a corresponding hole (not referenced) through the bottom plate 824. The bottom spacer supports the battery cell and the corresponding cell tube so that the bottom spacer, the corresponding hole through the bottom plate, the battery cell and the corresponding cell tube are all coaxially positioned and fixed with respect to each other. The bottom spacers are made or comprises a heat isolating and heat resistant material, to prevent heat from one overheating battery cell being transmitted through the bottom spacer to the cell tube or to the bottom plate 824. The bottom spacer can be made of ceramic or heat resistant plastic. The bottom spacers and the top spacers may be identical, so that the top spacers and the bottom spacers can be mutually interchangeable. The bottom spacer may comprise one part that is forced in the hole through the bottom plate, or two parts which can be screwed together.

The top spacer can be made of electric isolating material. The top spacer can provide an electric isolation between the negative pole of the battery cell 8120 on one side and the electronic components 822, the conductive layer 8620 or the PCB tracks in the conductive layer 8622 on the other side. If one wire bond 807 breaks or fuses, this electric isolation thus prevents electrical arcing between the battery cell 8120 and a conductive portion of the top plate 862. The outer edge 8630 of the top spacer can be thicker than the top plate 862 and form a rim 8632 that protrudes over the upper surface of the top plate 862 to increase the distance between the battery cell 8120 and the conductive portions 8622, 8620 of the top plate, thus reducing the risk of electrical arcing.

In a similar way, the bottom spacer can be made of electric isolating material. The bottom spacer can provide an electric isolation between the positive pole of the battery cell 8120 on one side and the bottom plate 824 on the other side and protrudes under the lower face of the bottom plate 824. If one wire bond 807 breaks or fuses, this electric isolation thus prevents electrical arcing between the battery cell 8120 and a conductive portion of the bottom plate 824.

This arrangement with heat-isolating spacers for supporting the battery cells and the cell tubes with the top and bottom plates can prevent or reduce the transmission of heat between an overheating battery cell and other battery cells of the same battery module through the top or bottom plate. Even if a cell tube becomes hot, for example if a battery cell within a cell tube burns or explodes, the top and bottom spacers can reduce the conductive transmission of heat from the cell tubes to other battery cells or cell tubes through the top and bottom plates 862 and 824 respectively.

The multiple battery cells, including the battery cell 8120, of the battery module 800 can store electrical energy. The electrical energy can be utilized for driving one or more motors, such as the motor 160. The one or more motors can propel a vehicle housing that is configured to fly. The multiple battery cells can be used to additionally or alternatively power other components supported by the vehicle housing.

One or more of the multiple battery cells can be Li-Ion or Li—Po battery cells. Individual of the multiple battery cells may be self-contained and be an off-the-shelf battery cell.

The multiple battery cells can be substantially shaped as a cylinder. At least some of each of the multiple battery cells can have the same or similar structures so that the at least some of each of the multiple battery cells may be used in place of one another.

Figure 9:
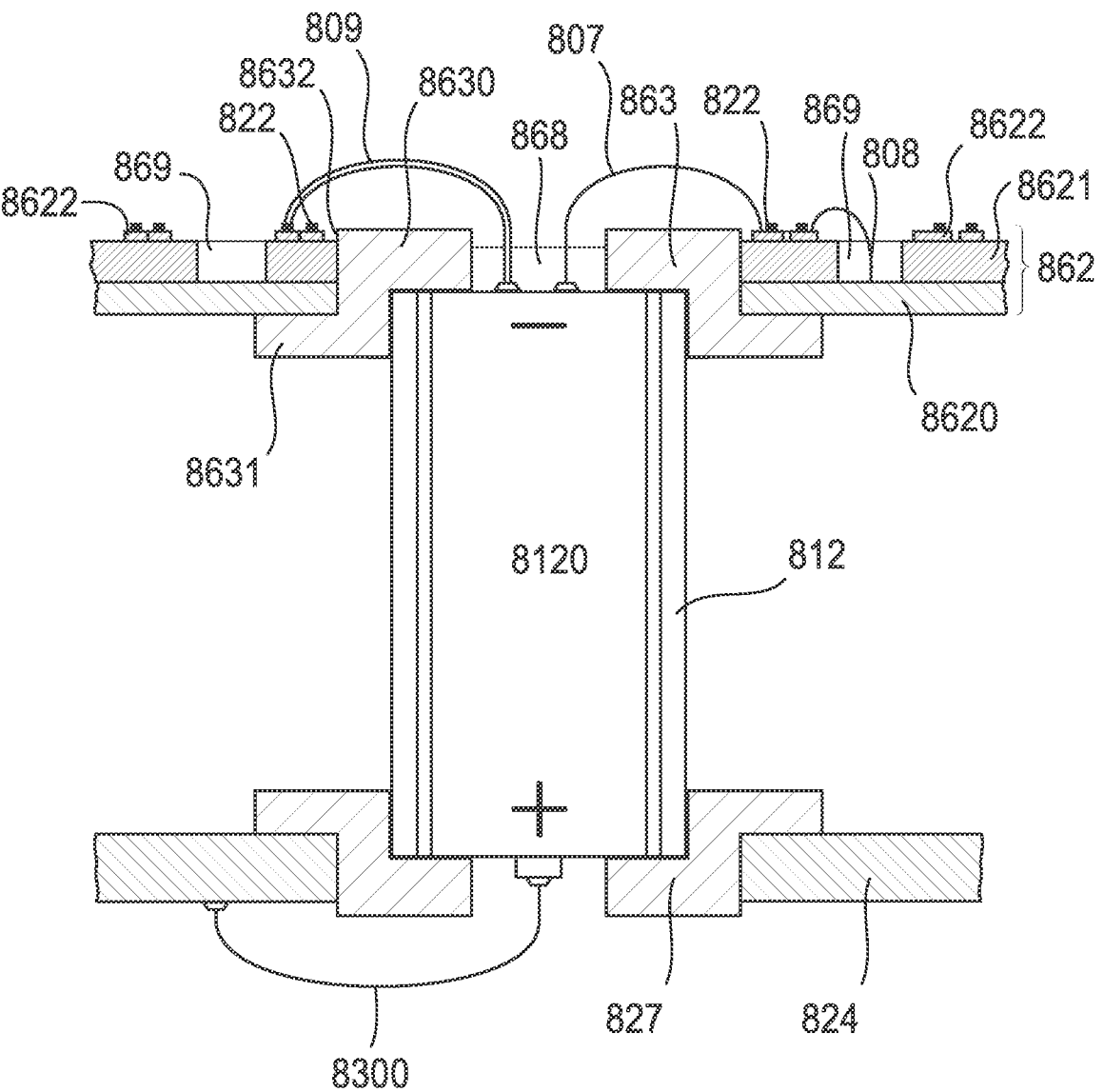
FIG. 9 illustrates an example of connection between a battery cell and a top conductive plate.

The multiple battery cells of the battery module 800 or subsets thereof can be electrically connected in series or parallel with one another to deliver a desired voltage and current. As illustrated in FIG. 9, for example, all of the multiple battery cells can be electrically connected in parallel with one another through the top plate 862 on one side and through the bottom plate 824 on the other side. As will be described, the top plate 862 and the bottom plate 824 each can comprise a relatively thick conductive layer, such as for example an aluminium layer 8620, for conducting the relatively high currents that are delivered by the plurality of battery cells in parallel.

Individual of the multiple battery cells of the battery module 800 can provide a current of 5 A, 10 A, 15 A, 20 A, 25 A, 30 A, 35 A, 40 A, 45 A, or 50 A or within a range defined by two of the foregoing values or another value greater or less than the foregoing values. Individual of the multiple battery cells can provide a voltage of 3.0 V, 3.2 V, 3.4 V, 3.5 V, 3.6 V, 3.8 V, 4.0 V, 4.2 V, 4.4 V, 4.5 V, 4.6 V, 4.8 V, or 5.0 V or within a range defined by two of the foregoing values or another value greater or less than the foregoing values. Individual of the multiple battery cells can provide an energy output of 5 Wh, 10 Wh, 15 Wh, 20 Wh, 25 Wh, 30 Wh, 35 Wh, 40 Wh, 45 Wh, 50 Wh, 55 Wh, 60 Wh, 65 Wh, 70 Wh, 75 Wh, 80 Wh, 85 Wh, 90 Wh, 95 Wh, or 100 Wh or within a range defined by two of the foregoing values or another value greater or less than the foregoing values. Individual of the multiple battery cells of the battery module 800 can have a height of 40 mm, 45 mm, 50 mm, 55 mm, 60 mm, 65 mm, 70 mm, 75 mm, or 80 mm or within a range defined by two of the foregoing values or another value greater or less than the foregoing values. Individual of the multiple battery cells of the battery module 800 can have a diameter of 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm or within a range defined by two of the foregoing values or another value greater or less than the foregoing values.

Individual of the multiple battery cells of the battery module 800 can be positioned within individual of the multiple cell tubes, as well as removed from individual of the multiple cell tubes. The fit of the individual of the multiple battery cells of the battery module 800 within the individual of the multiple cell tubes can, for instance, be a loose fit or a light interference fit. The multiple battery cells can be arranged in the multiple cell tubes so that negative terminals, such as a negative terminal 815, may be directed toward the top housing 804 rather than the bottom housing 826. Alternatively, one or more of the multiple battery cells can be arranged in the multiple cell tubes so that positive terminals may be directed toward the top housing 804 rather than the bottom housing 826.

The top plate 862 can be used to electrically connect two or more terminals of the multiple battery cells of the battery module 800. For example, where the multiple battery cells can be arranged in the multiple cell tubes so that negative terminals are directed toward the top housing 804, the top plate 862 can electrically connect the negative terminals to one another, such as via top wire bonding 807 through the hole 868, as shown in FIGS. 6C, 6F and 9 (such as aluminum wire bonding) or instead via spot welding. If the top plate

862 may be connected via the top wire bonding 807, the top wire bonding 807 can function as a fuse and decouple its mechanical, electrical and thermal connection responsive to a high temperature condition or a high electrical current condition.

The top plate 862 may comprise a plurality of subplates, for example, two, three, four, five, six, or any number of sub plates.

The top plate 862 may be conductive and electrically connected to a top plate or bottom plate of another battery module (not shown). The multiple battery cells of the battery module 800 can be electrically in series or parallel with the multiple battery cells of the another battery module. In one example, the multiple battery cells of the battery module 800 can be electrically connected in series with the multiple battery cells of the another battery module so that a combined voltage output from the battery module 800 and the another battery module may provide a desired voltage level.

The bottom plate 824 can be conductive and used to electrically connect two or more terminals of the multiple battery cells of the battery module 800. For example, where the multiple battery cells can be arranged in the multiple cell tubes so that positive terminals are directed toward the bottom housing 826, the bottom plate 824 can electrically connect positive terminals of the multiple battery cells to one another, such as via bottom wire bonding 8300 shown in FIGS. 6B and 9 (such as aluminium wire bonding) or instead via spot welding. If the bottom plate 824 may be connected via the bottom wire bonding 8300, the bottom wire bonding 8300 can function as a fuse and decouple its mechanical, electrical and thermal connection responsive to a high temperature condition or a high electrical current condition.

The bottom plate 824 may comprise a plurality of subplates, for example, two, three, four, five, six, or any number of sub plates.

Figure 7:
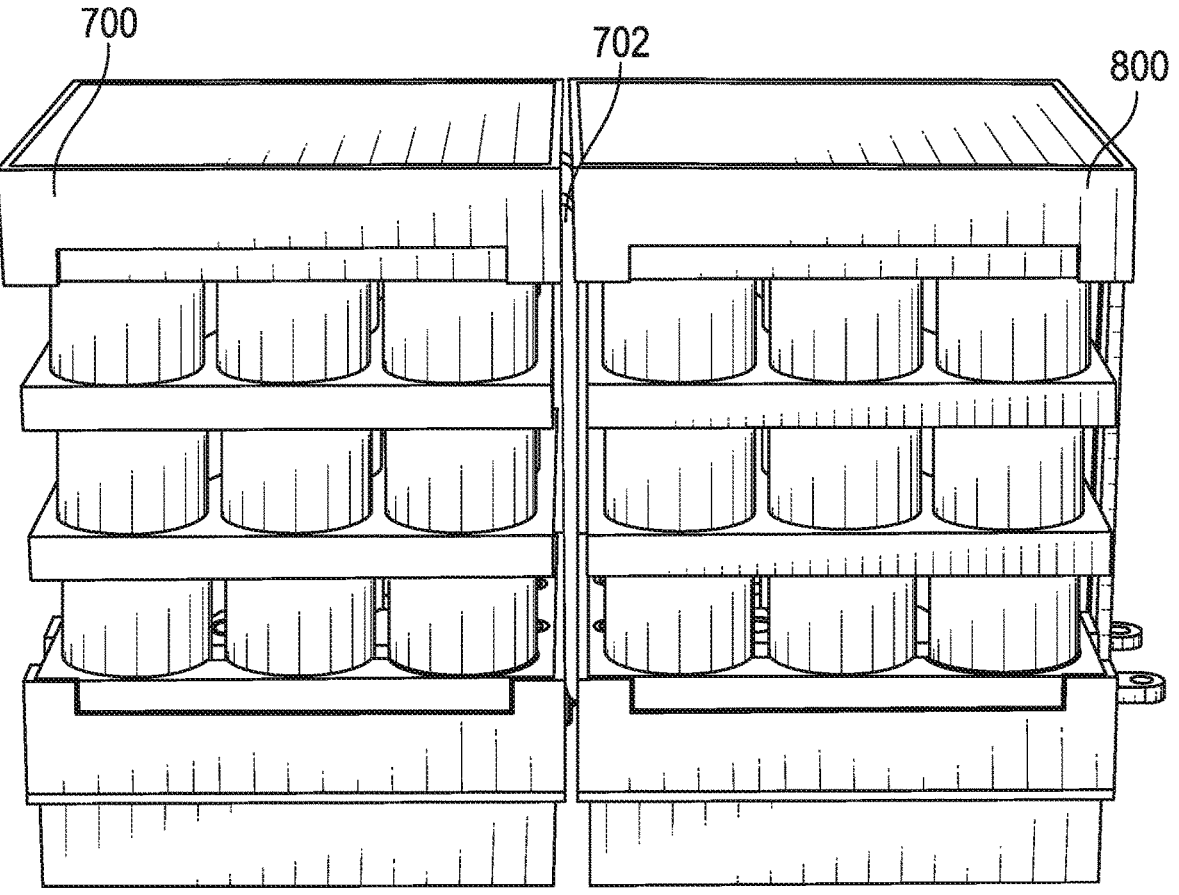
FIG. 7 illustrates example connected battery modules usable in a vehicle, such as the aircraft of FIG. 1A.

The bottom plates of one battery module, such as the battery module 800, can, as shown in FIG. 7, mechanically (for example, via one or more fasteners or an adhesive) and electrically connect to another top plate, such as another top plate 702, of at least one different battery module, such as the battery module 700. The mechanical connections can fix the battery module 800 to the different battery module 700 within a same battery pack. The multiple battery cells of the battery module 800 can be electrically connected in series or parallel with the multiple battery cells of the different battery module 700 in a battery pack. Where the structure of the different battery modules 700 may be the same or similar to the structure of the battery module 800, the different battery module 700 and the battery module 800 can, for instance, be connected in series with one another. The different battery module 700 and the battery module 800 can be electrically connected in series with the multiple battery cells of the another battery module so that a combined voltage output from the battery module 800 and the another battery module may provide a desired voltage level.

Although FIG. 7 illustrates two battery modules 700, 800 mechanically and electrically connected, one or more additional battery modules can be similarly mechanically and electrically connected. For example, three, four, five, six, seven, eight, nine, ten, or more battery modules can be similarly mechanically and electrically connected to together in a row to form a battery pack as power source having a greater performance capability (such as a greater voltage, current, or power output) than an individual one of the battery modules or a subset of the battery modules.

The top plate and the bottom plate of the battery module 800 can be or include aluminum, copper, or another conductive material. Although the top and bottom plates of the battery module 800 are shown as plates, the plates may each instead be one or more bars in other implementations.

FIG. 9 illustrates an example of mounting of the battery cell 8120 and the cell tube 812 between the top plate 862 and the bottom plate 824. The battery cell 8120 and the cell tube 812 are fixed or glued with top spacers 863 and bottom spacers 827 to the top plate 862 and to the bottom plate 824 respectively.

The top plate 862 comprises a printed circuit board (PCB) with a aluminium layer 8620 (which may be relatively thick), an isolating layer 8621, such as an epoxy layer, and a conductive layer 8622, such as a copper layer, (which may be relatively thin, such as thinner than the aluminium layer 8620). The aluminium layer 8620 is used as conductive plate for connecting the different battery cells of the battery module 800. Using aluminium can reduce the weight of the top plate 862; alternatively, other conductive materials, including copper, could be used in place of or in addition to aluminium. Since the layer 8620 is relatively thick, it can withstand the addition of currents from the plurality of battery cells in the battery module.

The conductive layer 8622 can be made up of a plurality of PCB tracks and PCB pads for mounting and connecting multiple electronic components 809, 822, such as one or more sensors 809, one or more switches (such as relays, MOSFETs, IGBTs) and/or one or more controllers. Each track of the conductive layer may, in certain implementations, be constructed to withstand the current from no more than one battery cell, or a portion of the current from one battery cell, so each track can be made relatively thin and light.

The one or more sensors 809 can be used for monitoring a voltage, a current, a temperature, or an internal pressure of each or the plurality of battery cells. The one or more sensors can be mounted on a PCB track of the conductive layer 8622, or, as the temperature sensor 809, between such a PCB track and the battery cell 8120. One or more sensors can be located remotely from the PCB tracks and connected to the PCB tracks to monitor parameters outside of the PCB track, such as the battery cell surface temperature.

The one or more switches can be used for selectively disconnecting each single battery cell, for example in case of over-temperature, over-current, over-voltage, over-pressure and/or other malfunctions of the battery cell.

The one or more controllers may be used for controlling the transfer of energy from or to the multiple battery cells of the battery module 800 or may monitor one or more parameters of the multiple battery cells. The one or more controllers can be in electrical communication with the multiple sensors to permit the one or more controllers to monitor at least some of the one or more parameters with the multiple sensors.

The aluminium layer 8620 can face the bottom plate 824 while the conductive layer, tracks 8622 may face the top direction of the battery module 800, toward the top housing 804. The conductive layer 8622 and the epoxy layer 8621 may be milled in order to create blind holes 869 for electrically connecting via wire-bonding the conductive layer 8620 with the battery cell 8120, the electronic components 822 and/or one track of the conductive layer 8622.

The current from one pole of the battery cell 8120 can flow directly to the conductive track 8620, for example through direct wire-bonding between the battery cell and the conductive track 8620. A pole of the battery cell can be connected through one wire bond 807 to one PCB track of the conductive layer 8622, and the current can flow through this PCB track to one or a plurality of electronic components 809, 822 such as sensors and/or switches, and then, via another PCB track of the conductive track 8622 and another wire-bond 808 that goes through a blind hole 869, to the thick conductive layer 8620 where the current will be added to the currents from one or more other battery cells. The sensor can be used for measuring a current or other parameters of the battery cell. The switch can be used for disconnecting the battery cell from the aluminium layer 8620 when a disfunction of the battery cell 8120 is detected by one sensor.

The multiple sensors can include one or more sensors, such as the sensor 822 or the temperature sensor 809. Sensors may physically pass through sensor holes (not shown) through the top plate 862 to permit the one or more sensors to detect one or more temperatures proximate to or on one or more of the multiple cell tubes or multiple cooling plates of the battery module 800.

The wire-bonds, such as wire bonds 807 and 808, can be used as fuses for disconnecting a battery cell when the temperature of one wire-bonds becomes sufficiently hot that the wire-bond melts. The melting of one of the wire-bonds may prevent greater than a set amount of current from passing, such as greater than a multiple (for instance, 1, 2, 3, 4, 5, 10, or 20 times) of a maximum operating current for the battery cell.

The one or more controllers can control operations of the battery module 800 and transfer of energy from or to the multiple battery cells at least according to sensor data generated by the multiple sensors. For example, the one or more controllers can shut down power generation by the battery module 800 or trigger an alarm responsive to a detected high temperature condition by one of the multiple sensors.

In another embodiment (not shown), the isolating layer 8621 of the top plate 862 can be a thin isolating layer that may not be rigid, and the upper copper layer 8622 can be replaced with a flexible printed circuit board (Flex PCB) fixed or glued to that isolating layer. The electric connection between the battery cell and the flex PCB's tracks or electronic components 822 can be done by wire bonding and the electric connection from the Flex PCB to the aluminium layer 8260 can be performed via through-holes through the Flex-PCB and holes through the isolating layer 8621 or wire bonding between the flex PCB's tracks and the aluminium layer.

An additional module circuit board 820 (FIGS. 6A and 6C) can be positioned on a lateral side of the battery module 800 so that the additional module circuit board 820 is out of the path of a fire from one or more of the multiple battery cells and does not obstruct the exhaust of heat or fumes from any overheating battery cell. The additional module circuit board 820 can be fixed to the top housing 804 and/or to the bottom housing 826. Some of the sensors 622 and one or more controllers can be mounted onto the additional module circuit board 820 instead of the top plate 862. The top plate 862 and the additional module circuit board 820 can be electrically connected to each other through one or more cables and connectors.

The multiple connectors, including the connector 825, of the battery module 800 can be mechanically and electrically connected to the additional module circuit board 820. The multiple connectors can be used by the one or more controllers of the additional module circuit board 820 to receive data from the components on the top plate 862 and/or from outside the battery module 800 or transmit data to the components on the top plate 862 and/or outside the battery module 800.

The one or more controllers can receive commands via one or more of the multiple connectors. The commands can, for instance, be used by the one or more controllers to set an operating mode for the battery module 800 or configuration settings (such as an operating power level or permissible operating temperature limit) for the battery module 800. The one or more controllers can, for instance, transmit operating status or logs, sensor data detected by the multiple sensors, or alarms via one or more of the multiple connectors.

The multiple connectors can include a total of four connectors as illustrated. In other implementations, the battery module 800 may instead include one, two, three, five, six, or more connectors. Where the multiple connectors of the battery module 800 may include a total of two connectors as illustrated, one of the multiple connectors can be input connector for receiving data and the other of the multiple connectors can be input connector for transmitting data. Alternatively, both of the multiple connectors can function to input and output data and may, for example, communicate via separate communication channels, such as with redundant controllers. At least some of each of the multiple connectors can have the same or similar structures so that the at least some of each of the multiple connectors may be used in place of one another. One or more of the multiple connectors may be a serial bus connector. Although the multiple connectors are illustrated as female connectors in FIG. 6B, the multiple connectors can be male or female connectors.

Figure 6B:
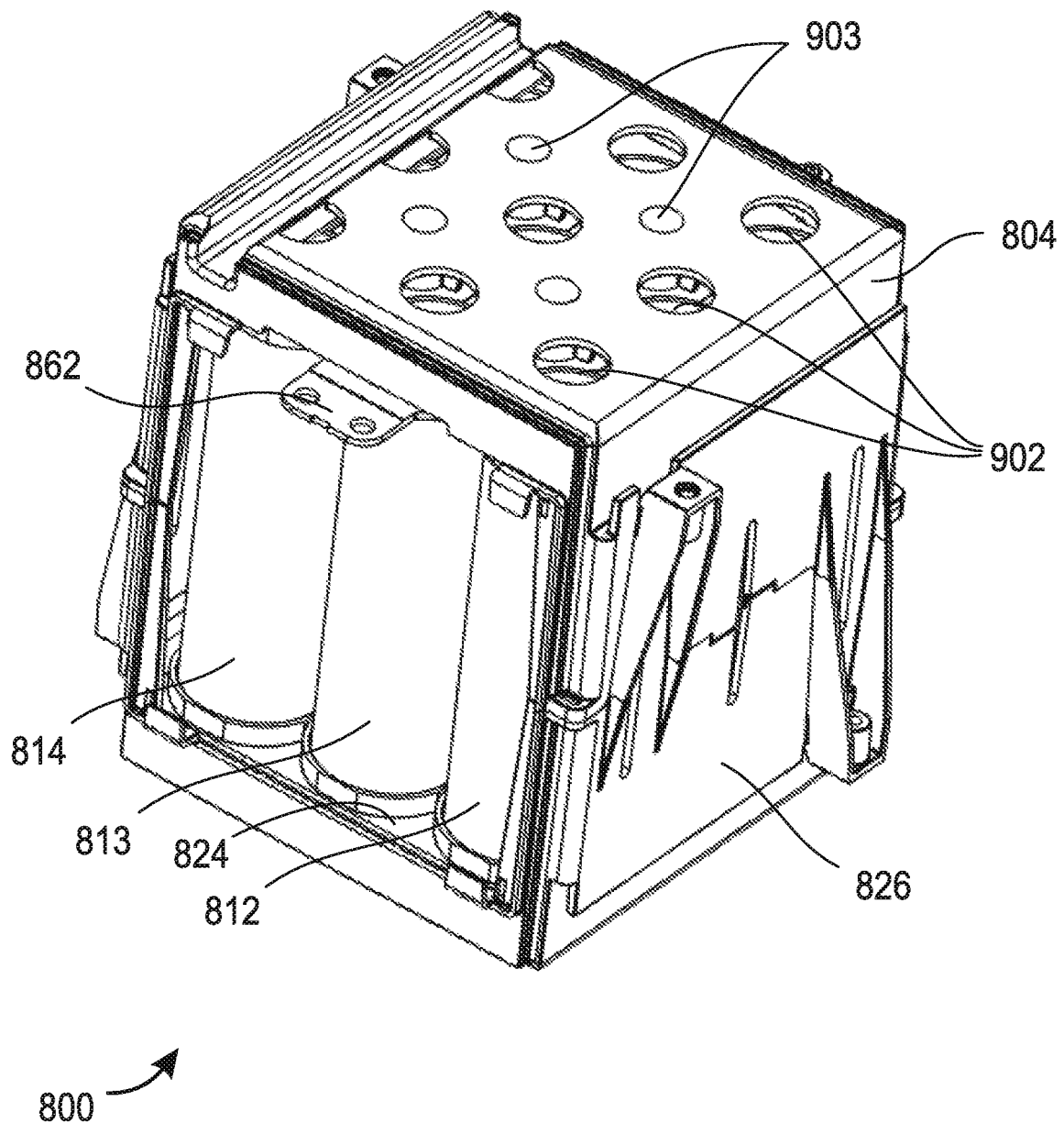
Figure 6C:
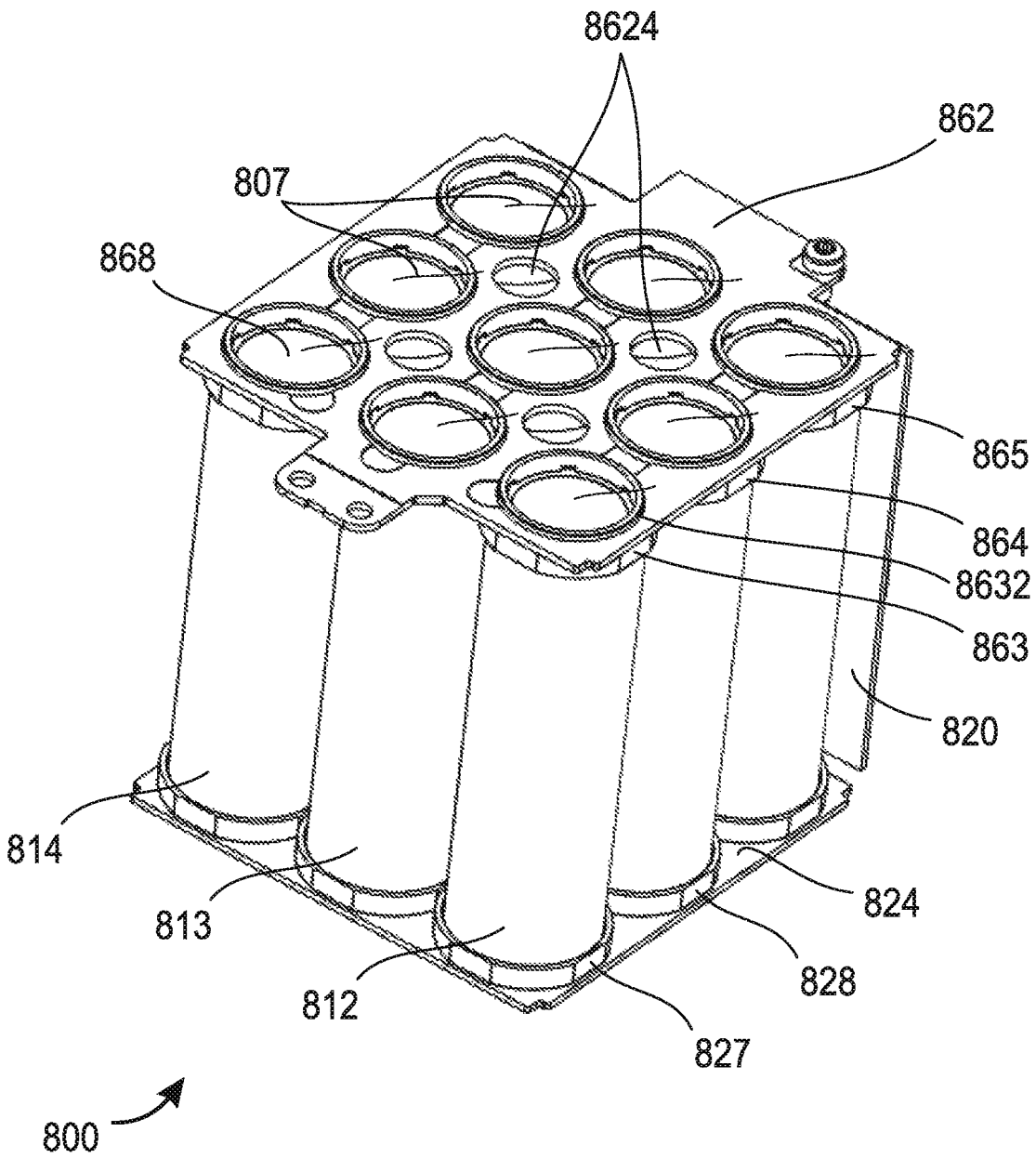
Figure 6D:
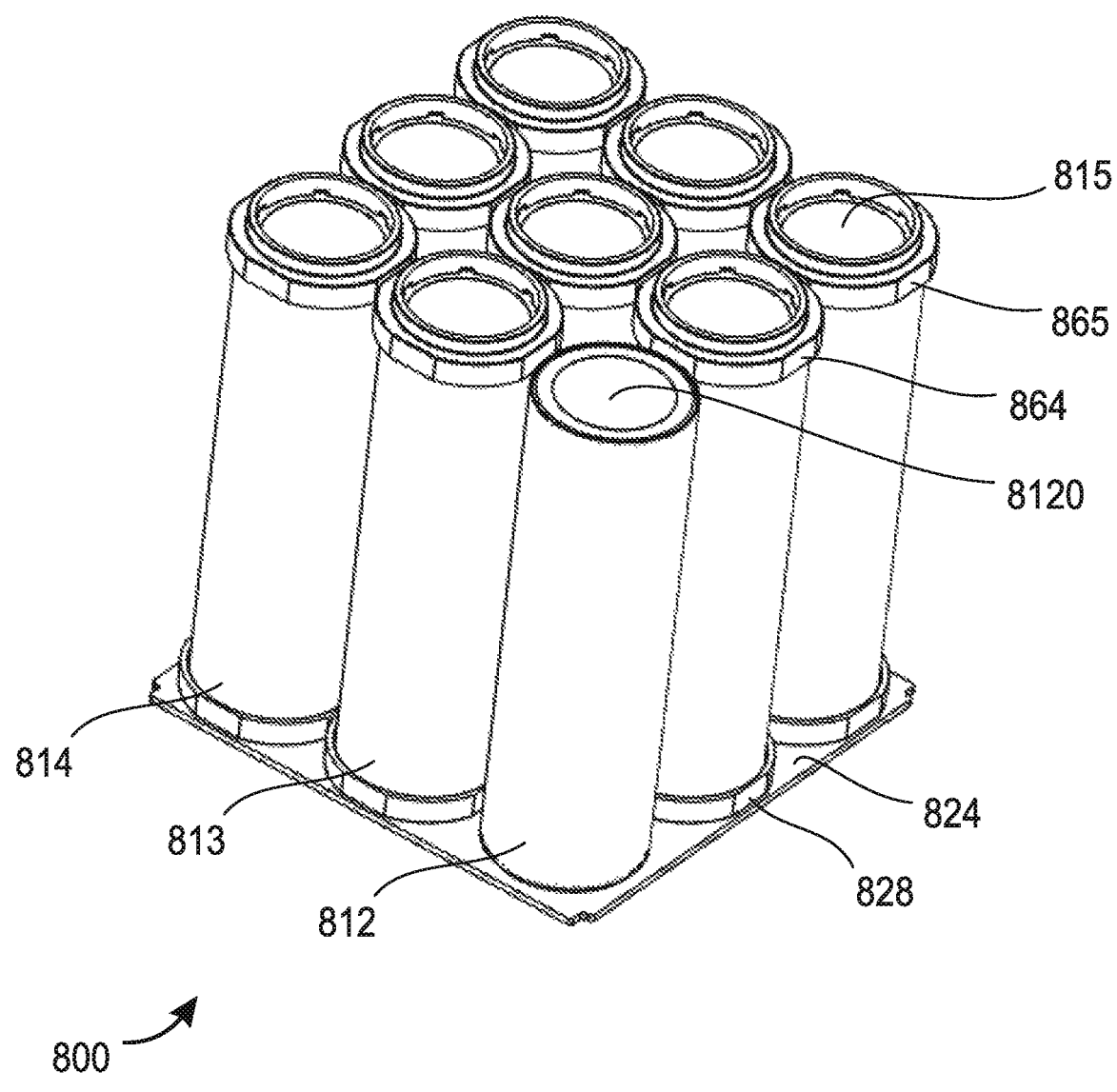
Figure 6E:
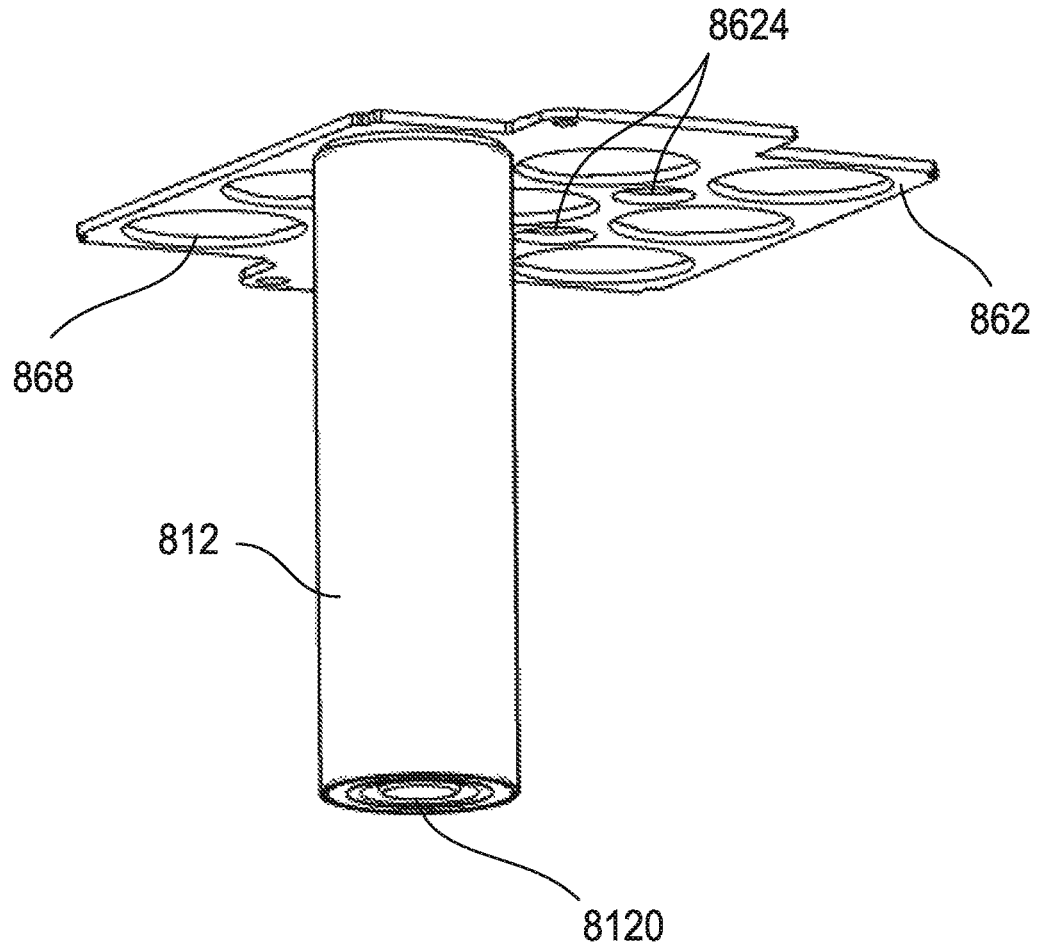
Figure 6F:
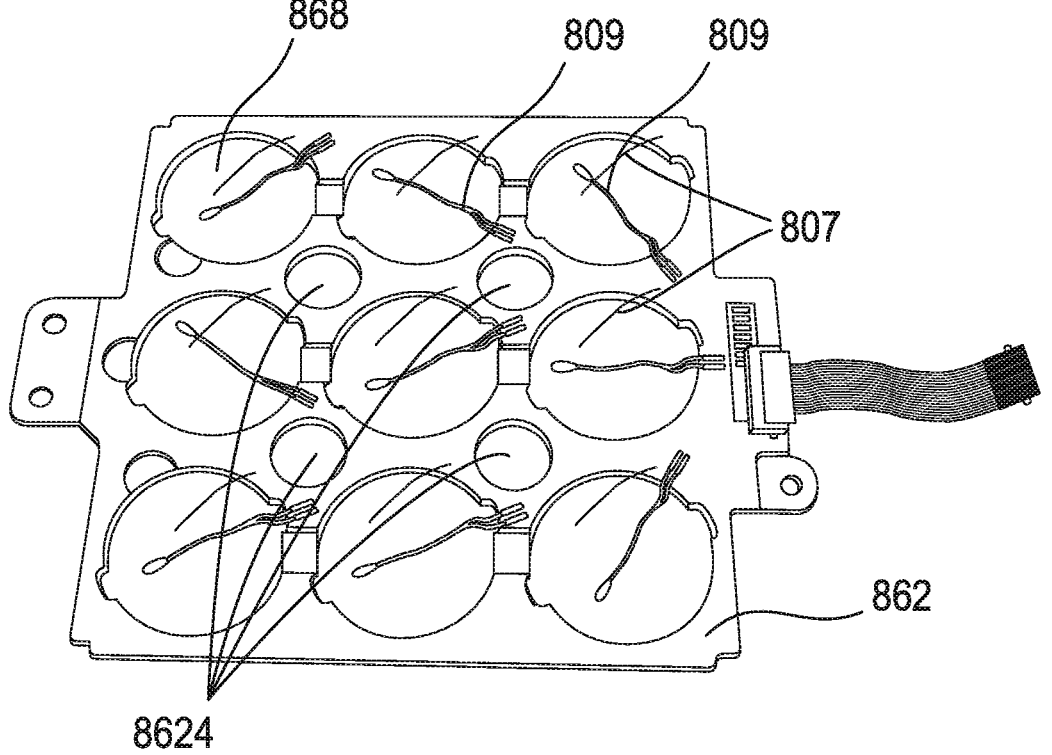
Figure 6G:
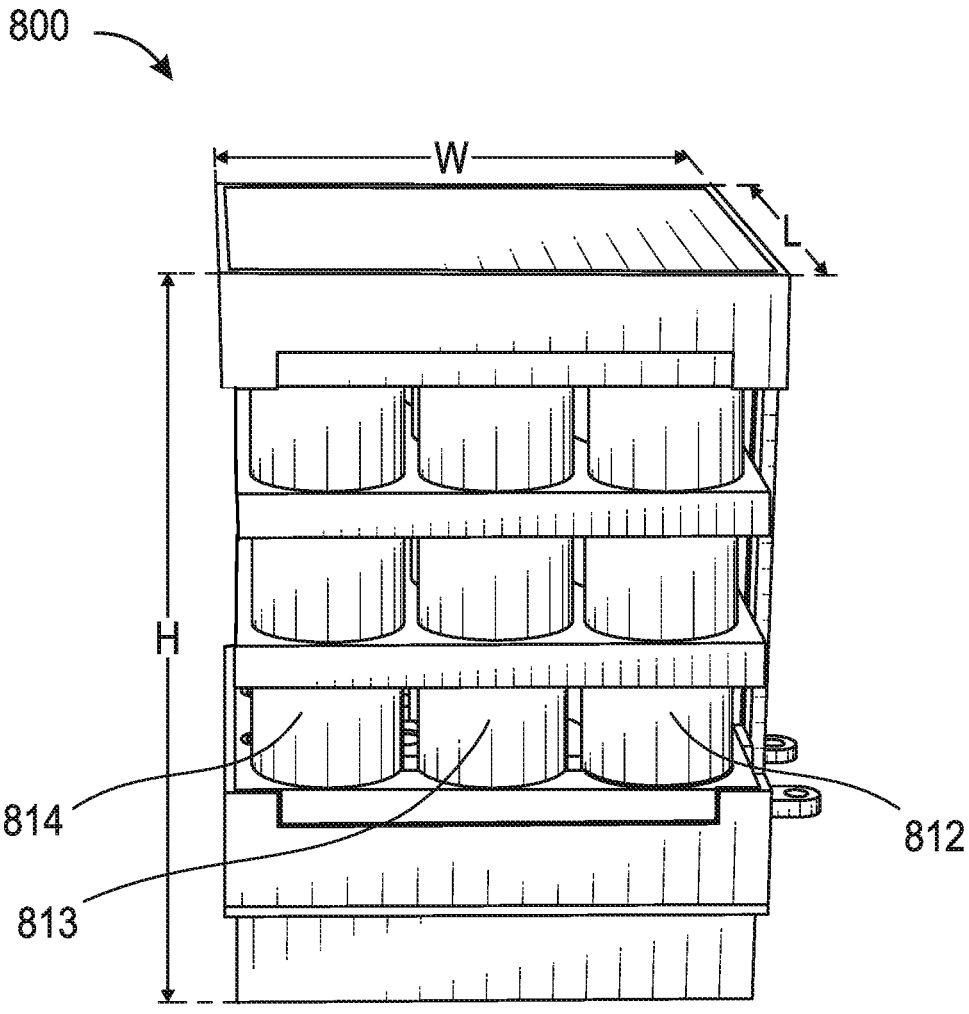

The battery module 800 can have a length of L, a width of W, and a height of H as shown in FIG. 6G. The length of L, the width of W, or the height of H can each be 50 mm, 65 mm, 80 mm, 100 mm, 120 mm, 150 mm, 200 mm, 250 mm, 300 mm, 350 mm, 400 mm, 450 mm, or 500 mm or within a range defined by two of the foregoing values or another value greater or less than the foregoing values. For example, L can be around 80 mm, W can be around 80 mm, and H can be around 100 mm.

The battery module 800 may include fewer or additional components in some implementations. For example, the battery module 800 can include a heat absorber material (not shown), such as a phase change material, a gel, or the like, between the top housing 804 and the battery cells to absorb heat and energy upon the one or more of the multiple battery cells of the battery module 800 catching fire and which may help the fire from reaching the other of the multiple battery cells.

The battery module 800 can be constructed and positioned, such as in a vehicle, so that air may flow by the battery module 800 in a direction from the bottom housing 826 to the top housing 804 or may circulate from one side of the battery module 800 to another side. The air flowing by the battery module 800 can flow through the top plate 862 through holes 8624 and through corresponding holes (not shown) through the bottom plate 824. The holes 8624 through the top plate 862 and the corresponding holes through the bottom plate 824 direct the air to flow between the cell tubes, such as the cell tubes 812, 813, 814 and other cell tubes, but may not flow within the cell tubes to prevent humidity, dust, heat or fumes from reaching the battery cells, such as the battery cell 8120, within the cell tubes.

The air flowing by the battery module 800, such as from an inlet channel as described herein, can cool the multiple battery cells of the battery module 800, as well as be used to expel any combustion products, fumes, smoke, heat, or steam from the battery module 800. After the air passes by the battery module 800, the air may be transferred to an exhaust, such as an exhaust channel as described herein. Such construction and positioning of the battery module 800 may advantageously permit cooling of the multiple battery cells and expelling of any combustion products, fumes, smoke, heat, or steam with a single combined system rather than utilizing two different systems that may add additional weight.

The full wing structure of an aircraft may be vented so that an inner volume of the wing can act as an exhaust channel. In that case, no additional structure may be added to create the exhaust channel.

As illustrated in FIGS. 6A and 6B, the top housing 804 can be provided with holes 902 or valves, each hole or valve being coaxial with one battery cell, one cell tube, one top spacer and one bottom spacer, so that heat and fumes from one overheating battery cell will pass through one of the battery spacer, through one of the holes through the top plate 862, through the corresponding hole 902 or valve and out of the top housing 804.

The holes 902 through the top housing 804 may be covered with a tape or a cover (not shown) that closes the hole during normal operation, and prevent humidity and dust from entering the battery cell terminal region or the volume between the top plate respectively bottom plate and the housing.

The top housing 804 can be provided with holes 903 for circulating air between the cell tubes.

The tape or cover may not cover the holes 903 thus allowing air to circulate between the cell tubes and cool the cell tubes and the battery cells within the cell tubes.

In a similar way, holes (not shown) through the bottom housing 826 that may be disposed coaxially with a corresponding cell tube may be covered with a tape or a cover (not shown) that closes the hole during normal operation, and prevent humidity and dust from entering the battery cell terminal region. The tape or cover does not cover the holes through the bottom housing thus allowing air to circulate between the cell tubes and to cool the cell tubes and the battery cells within the cell tubes.

If one of the multiple battery cells of the battery module 800 catches fire, the tape or cover on the top housing 804 or bottom housing 826 can be moved by a pressure difference between (i) a pressure in housing of the one of the multiple battery cells that caught fire and (ii) a pressure on a side of the tape opposite of the one of the multiple battery cells that caught fire. The pressure difference may entirely separate the tape or cover from the battery module 800, or tear the tape or cover to create an opening through the tape or cover for releasing the pressure within the housing.

Figure 8:
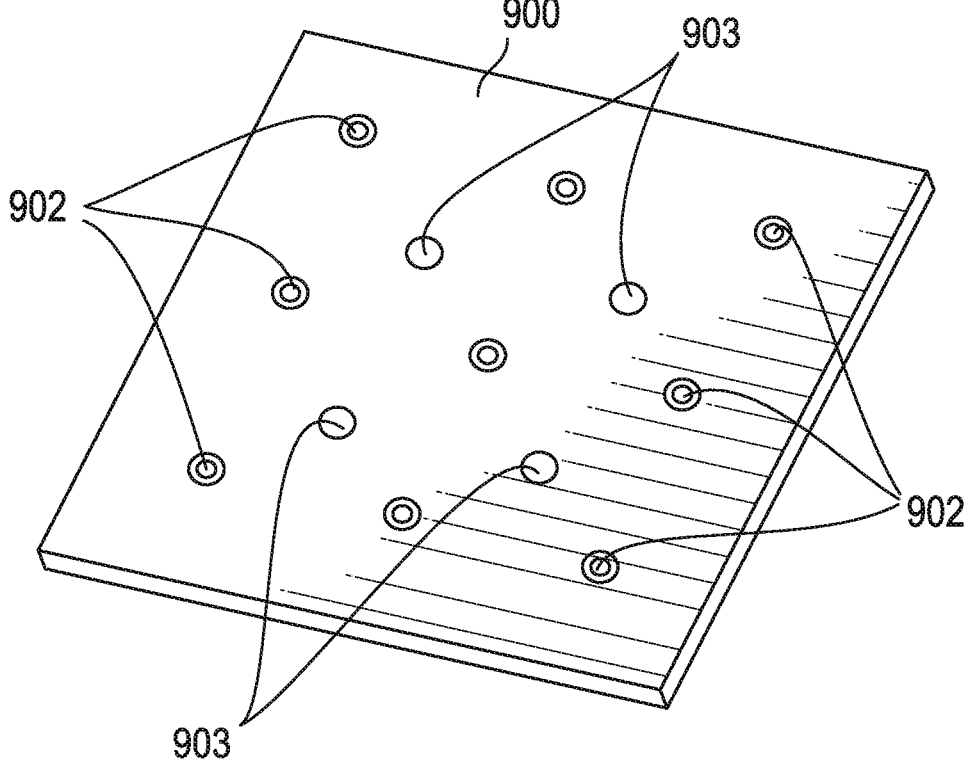
FIG. 8 illustrates an example top cover with holes usable with a battery module.

FIG. 8 illustrates a top cover 900 with cover holes, such as a cover hole 902, usable with a battery module, such as the battery module 800. The top cover 900 can be used in place or as part of the top housing 804 and/or bottom housing 826. The cover holes can permit combustion products, fumes, smoke, heat, or steam to escape from one or more of the multiple battery cells of the battery module 800 that catch fire without permitting the combustion products, fumes, smoke, heat, or steam to enter another of the multiple battery cells. The cover holes may permit a certain amount or rate of combustion products, fumes, smoke, heat, or steam to escape and a certain amount of energy absorption by the top cover 900 prior to the top cover 900 being moved by a pressure difference between (i) a pressure in the one or more cell tubes of the one or more of the multiple battery cells that catch fire and (ii) a pressure on a side of the top cover 900 opposite the one or more cell tubes of the one or more of the multiple battery cells that catch fire.

Figure 10:
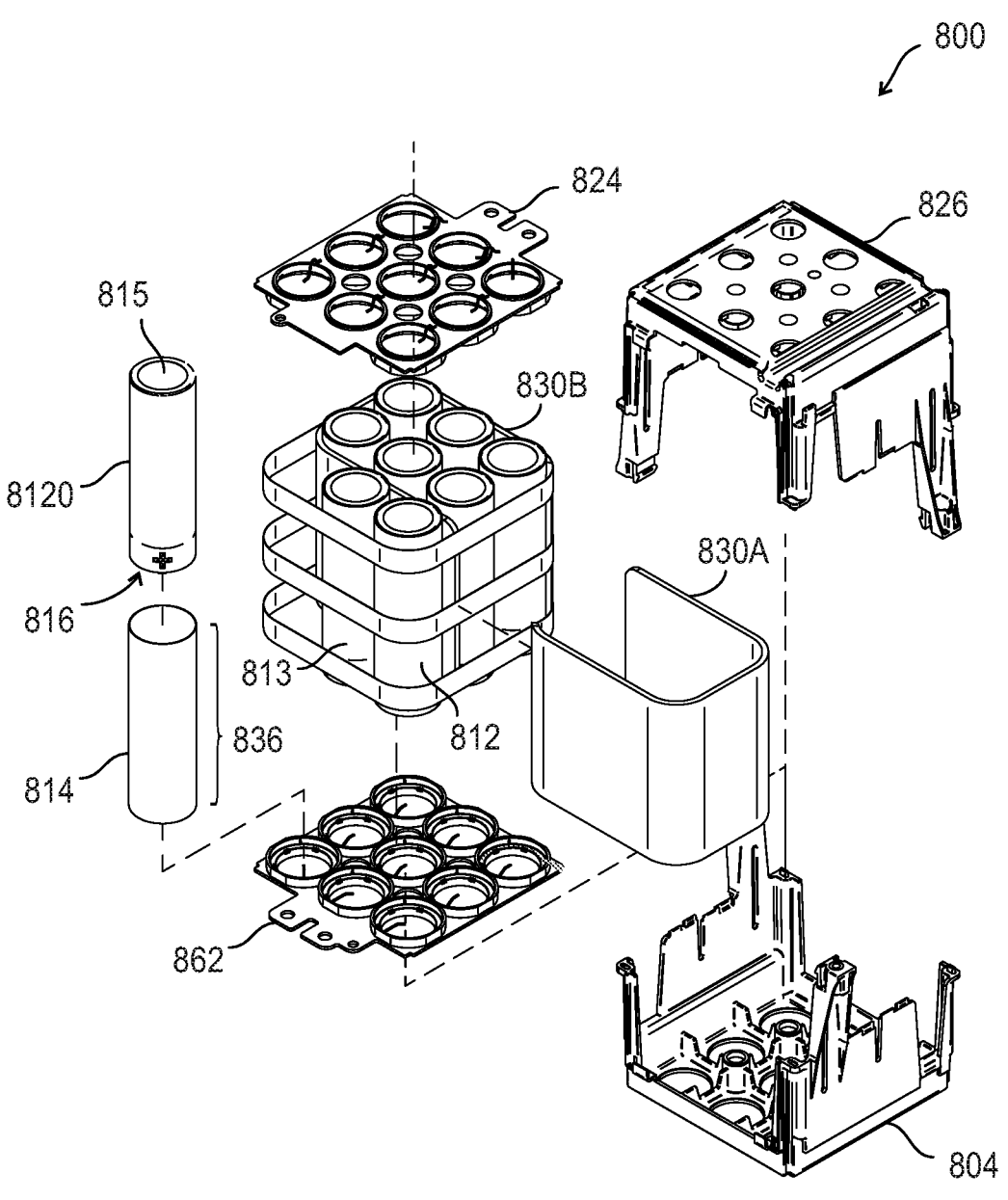
FIG. 10 illustrates an exploded view of an example battery module.

FIG. 10 illustrates an exploded view of an example battery module 800, which may be configured as illustrated in one of the FIGS. 6A to 6G.

The battery module 800 as illustrated comprises multiple cell tubes 812, 813, 814, . . . each housing one battery cell 8120 with a positive pole 816 and a negative pole 815. The anode 815 of each battery cell faces towards the top plate 862. The cell tubes 812-814 are supported by the top plate 862, and maintained within holes through this top plate by spacers (not referenced). The spacers are made of heat isolating material, such as ceramic, composites such as glass fibre, etc. material to reduce transmission between the cell tubes and the first plate. The cell tubes are spaced apart.

At least one heat absorbing member 830 is inserted into the volume between the cell tubes 812-814. The heat absorbing member 830 may consist of two heat absorbing sub members, namely a first sub member 830A and a second sub member 830B.

The heat absorbing member 830 is inserted into the volume between the cell tubes 812-814 such that it surrounds at least partly each of the cell tubes 812-814.

As illustrated in the figure, the heat absorbing member 830 substantially extends along the entire length of the elongated surface of the cell tubes 812-814. The plurality of cell tubes 812-814, each housing one battery cell, and the heat absorbing member 830, form an assembly.

An attachment suggested in FIG. 10 and illustrated by three stripes surrounding the assembly is sandwiched between the top plate 862 and the bottom plate 824, and used to maintain the heat absorbing members 830 within the assembly. The plates 862, 824 are arranged each at one end of the cell tubes 812-814 when combined.

The top housing 804 and the bottom housing 826, when combined, are part of the housing 508 of the battery module 800. The housing encloses the assembly as well as the top plate 862 and the bottom plate 824.

Figure 11A:
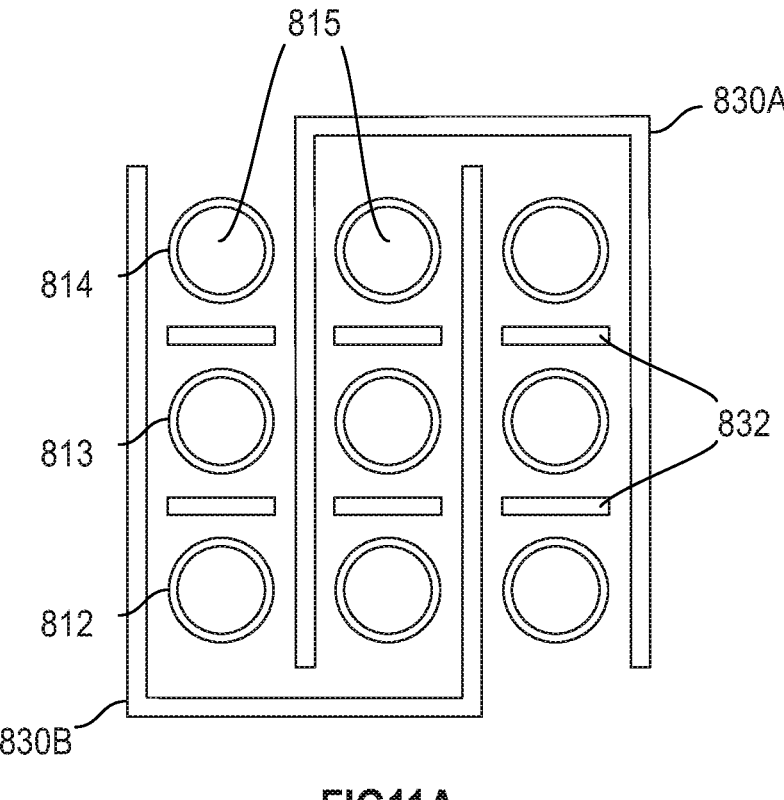
FIGS. 11A, 11B, 11C and 11D illustrate possible (but not exclusive) configurations of a heat absorbing member enclosing a plurality of cell tubes.
Figure 11B:
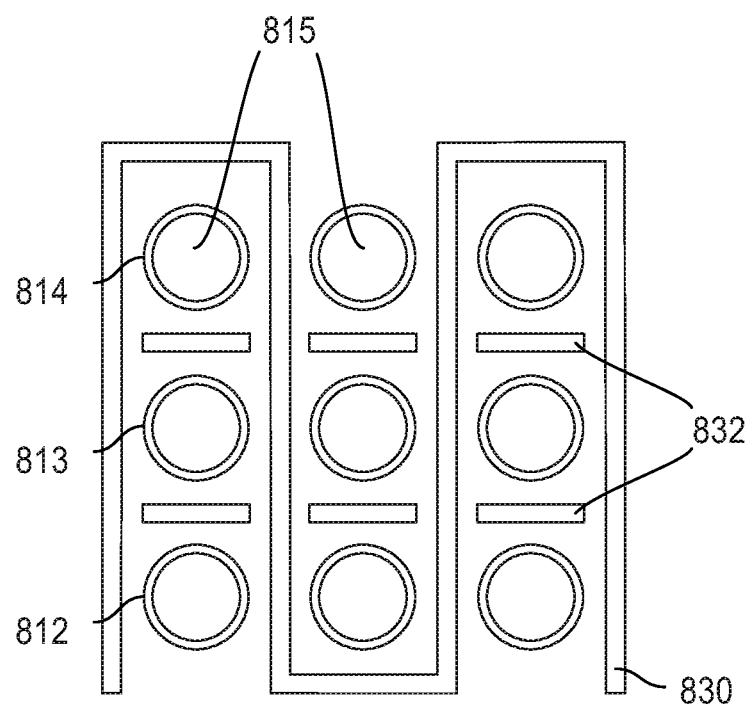
Figure 11C:
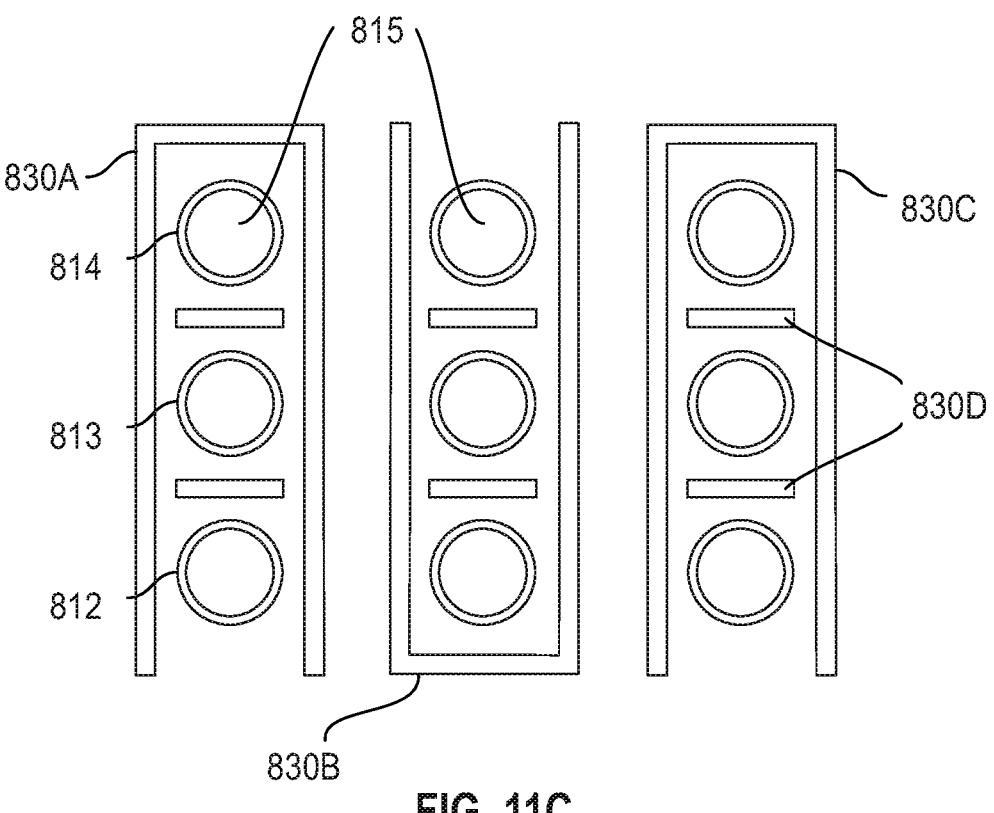
Figure 11D:
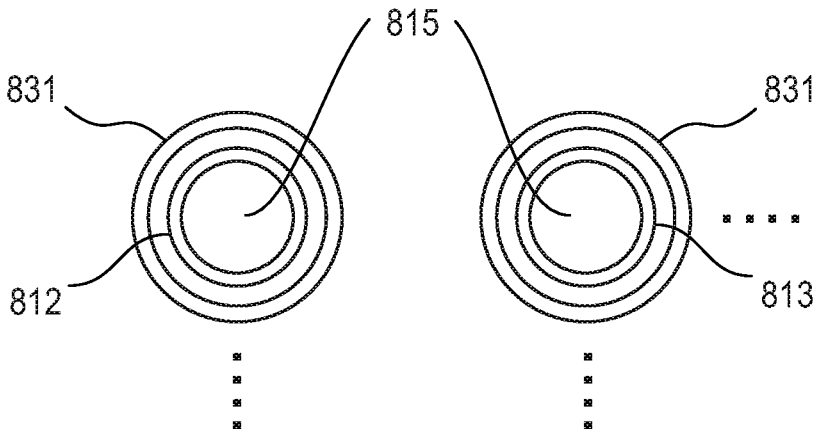

FIGS. 11A to 11D illustrate possible, but not exclusive, arrangements of heat absorbing members 830 enclosing a plurality of cell tubes 812-814. FIGS. 11B to 11D illustrate alternatives to the configuration of the heat absorbing member 830 presented in FIG. 10.

FIG. 11A illustrates the arrangement of the heat absorbing member as of FIG. 10 in a top view. A plurality of cell tubes 812-814 is arranged in a matrix-like structure, having spaces between the cell tubes 812-814.

The negative pole 815 of the battery cells, one being housed in each of the plurality of cell tubes 812-814, is facing upwards in this example. The heat absorbing member 830 also consist in this example of two heat absorbing sub members, namely a first sub member 830A and a second sub member 830B.

The first heat absorbing sub member 830A is inserted into the volume of the matrix-like structure, such that it surrounds a first set of cell tubes 812-814. The second heat absorbing sub member 830B is inserted into the spaces of the matrix-like structure, such that it surrounds a second set of cell tubes 812-814. Each set consists of six cell tubes 812-814. It can be noticed that each of the plurality of cell tubes 812-814 is partly surrounded by the heat absorbing member 830, composed of two sub members 830A, 830B.

The heat absorbing member 830 does not fill the complete volume between adjacent cell tubes 812-814. An air flow 832 (FIG. 14) flows through the empty volume to cool the plurality of cell tubes 812, 813, 814, . . . and the heat absorbing member 830.

FIG. 11B illustrates in a top view a further example of a heat absorbing member 830 partly surrounding the plurality of cell tubes 812-814. A plurality of cell tubes 812-814 is arranged in a matrix-like structure, leaving a volume between the cell tubes 812-814. The negative pole 815 of the battery cells, one housed in each of the plurality of cell tubes 812-814, is facing upwards.

The heat absorbing member 830 is inserted into the spaces of the matrix-like structure in a meandering course, such that each of the plurality of cell tubes 812-814 is at least partly surrounded by the heat absorbing member 830. Some spaces between adjacent cell tubes 812-814 do not contain any portions of the heat absorbing member 830. An air flow 832 to cool the plurality of cell tubes 812-814 and the heat absorbing member 830 flows through said empty spaces.

FIG. 11C illustrates in a top view a third example of a heat absorbing member 830, surrounding the plurality of cell tubes 812-814.

A plurality of cell tubes 812-814 is arranged in a matrix-like structure, leaving a volume between the cell tubes 812-814. The negative pole 815 of the battery cells, one housed in each of the plurality of cell tubes 812-814 is facing upwards.

The heat absorbing member 830 consists in this example of multiple heat absorbing sub members, namely a first sub member 830A, a second sub member 830B, a third sub member 830C and a fourth sub member 830D. The first, the second and the third heat absorbing sub members 830A-830C are inserted into the empty volume of the matrix-like structure, such that each surrounds a set of three cell tubes 812-814, forming a row.

The heat absorbing members are arranged such that two portions of the heat absorbing sub members 830A-830C are placed between two adjacent rows. To be more precise, the first heat absorbing sub member 830A and the second heat absorbing sub member 830B are arranged such that a portion of each of the heat absorbing sub member 830A, 830B are located side by side. The same situation applies between the second and the third heat absorbing sub members 830B, 830C.

This configuration provides an improved level of safety, as the heat transfer in case of a thermal event caused by a battery cell 812-814 housed in a cell tube 812-814 is even more reduced when compared to one of the examples as disclosed before, by using two portions of the heat absorbing member 830 side by side.

A fourth heat absorbing sub member 830D is arranged between the plurality of cell tubes 812-814 enclosed by one of the other heat absorbing sub member 830A-830C, such that the heat transfer between neighboring cell tubes in a row is reduced. The fourth heat absorbing sub member 830D reduces the risk of igniting further thermal events between the battery cells contained in the cell tubes of a row.

Each of the plurality of cell tubes may be enclosed by multiple heat absorbing sub members 830A-830D of the heat absorbing member 830. The heat absorbing member 830 and the plurality of cell tubes are spaced apart from each other such that an air flow (not shown) can circulate through the housing to cool the plurality of cell tubes 812-814 and the heat absorbing member 830.

FIG. 11D illustrates in a top view a last, but not exclusive, example of multiple heat absorbing members 831, enclosing the plurality of cell tubes 812-814. A plurality of cell tubes 812-814 are arranged in a matrix-like structure, having volume between the cell tubes 812-814. Only a portion of the matrix-like structure is illustrated.

The negative pole 815 of the battery cells, one being housed in each of the plurality of cell tubes 812-814 is facing upwards in this example. The heat absorbing members 831 are not configured as illustrated in one of the previously disclosed examples in a shape of a rectangular pouch. The heat absorbing members 831 are configured in a shape of a hollow cylinder, enclosing each of the plurality of cell tubes 812, 813 and preferably enclosing the plurality of cell tubes 812, 813 along the entire length of the elongated surface of each of the plurality of cell tubes 812, 813. Other properties, such as the heat absorbing material contained in the shell of the heat absorbing member 831 may be similar to the properties as disclosed herein before.

This arrangement provides the advantage that heat is prevented from being transferred to neighboring cell tubes 812, 813 in case of a thermal event. On the one hand each of the cell tubes 812, 813 is enclosed by one heat absorbing member 831. On the other hand, neighboring cell tube 812, 813 are also enclosed by a heat absorbing member 831. This provides a two-fold safety and it is very unlikely that a thermal event in one of the cell tubes 812, 813, caused by a battery cell, may spread to further battery cells contained in neighbouring cell tubes 812, 813. The heat absorbing members 831 and the plurality of cell tubes 812, 813 are spaced apart from each other, such that an air flow (not shown) can circulate through the housing to cool the plurality of cell tubes 812, 813 and the heat absorbing members 831.

Figure 12:
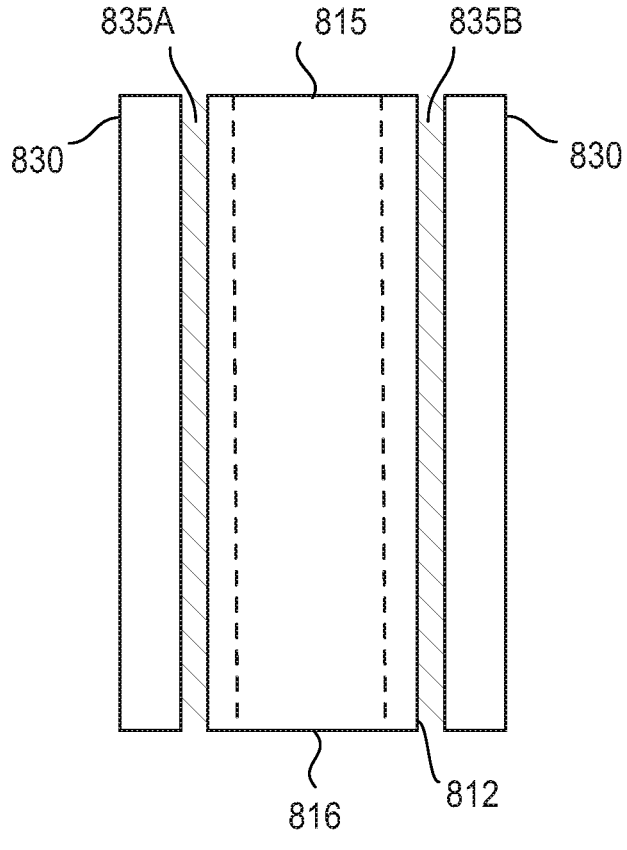
FIG. 12 illustrates a detailed example of a heat absorbing member surrounding a cell tube.

FIG. 12 illustrates a detailed example of a heat absorbing member 830, surrounding a cell tube 812.

A cell tube 812 houses a battery cell having a positive pole 816 and a negative pole 815. The heat absorbing member 830 extends along the elongated surface of the cell tube 812. The heat absorbing member 830 can be arranged such that it leaves a first space 835A on one side between the cell tube 812 and the heat absorbing member, wherein said space may contain air and/or may allow an air flow to cool the heat absorbing member 830 and the cell tube 812.

The heat absorbing member 830 may further be arranged such that it is in contact with the elongated surface of the cell tube 812 on an other side of the heat absorbing member 830 and forming a contact path 835B that extends along the entire length of the elongated surface of the cell tube 812.

Placing the heat absorbing member 830 as explained before provides the advantage that the temperature point where the heat absorbing material comprised in the heat absorbing member starts its transition from a first state of matter into its final state of matter can be controlled.

The contact path 835B provides a thermal bridge and a heat transfer from the cell tube 812 to the heat absorbing member 830 starts sooner in case of a thermal event.

Alternatively, the heat absorbing member 830 might be arranged to form multiple contact paths 835B. Alternatively, the heat absorbing member 830 might be arranged such that a direct contact between the cell tube and the heat absorbing member is prevented, using a spacing means. The methodology as explained may be applied to all examples as disclosed hereinbefore.

Figure 13A:
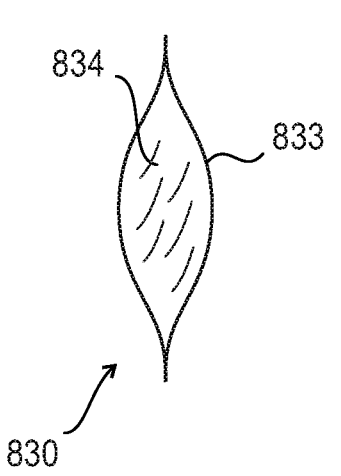
FIGS. 13A and 13B illustrate a detailed view of an example heat absorbing member enclosing a heat absorbing material in a shell.
Figure 13B:
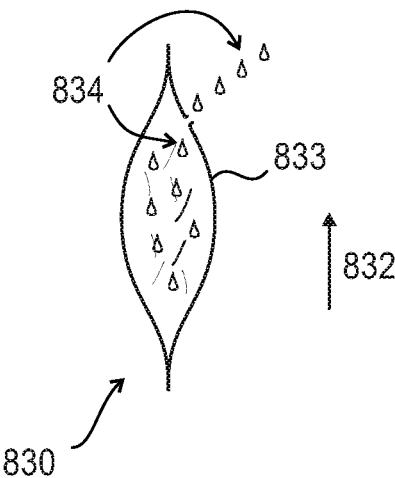

FIGS. 13A and 13B illustrate in a detailed view a heat absorbing member 830 comprising a heat absorbing material 834 in a shell 833.

FIG. 13A illustrates a shell 833, enclosing a heat absorbing material 834. The shell 833 is hermetically sealed such that the heat absorbing material 834 is prevented from exiting.

The shell 833 is for example made of a plastic foil or may be made of a composite comprising a plastic and a metal foil, possibly reinforced and/or laminated with carbon fibers. A metal shell provides a fast and effective transmission of heath to the whole volume of phase change material within the shell, and from the cell tube to the phase change material.

The heat absorbing material 834 may be in its liquid state of matter at temperature below 323 K.

The heat absorbing material 834 may comprise a mixture of materials. The different materials may have different phase transition temperature. The materials may be mixed, or contained within two sub-pouches.

A first material may be in its solid state of matter at operational temperature, for example at temperature below 323 K. A second material may be in its liquid state of matter at operational temperature, for example at at least one temperature between 300 and 350 K. The first material may be in spension into the second material One material may be water. The second material may be paraffin. The paraffin may be encapsulated. The paraffin may be in suspension into the liquid.

The heat-absorbing material may comprise for example a mixture of water and alcohol, in particular a mixture of water and glycol. The water might be demineralized, and additional additives, such as salt, might be added.

FIG. 13B illustrates the heat absorbing member 830 of FIG. 13A, whereas some portions of the heat absorbing material 834 have entered the final state of matter and are gaseous.

Other remaining portions of the heat absorbing material 834 are still liquid. The pressure inside the shell 833 was raised until a predetermined level due to a thermal event in one of the neighboring cell tubes (not shown) and the shell 833 released the gaseous portion of heat absorbing material 834 via a predetermined breaking point.

An arrow indicates an air flow 832, here the air flow 832 flowing trough the housing and leaving through one of the vent holes provided in the top plate and the housing (not illustrated).

Figure 14:
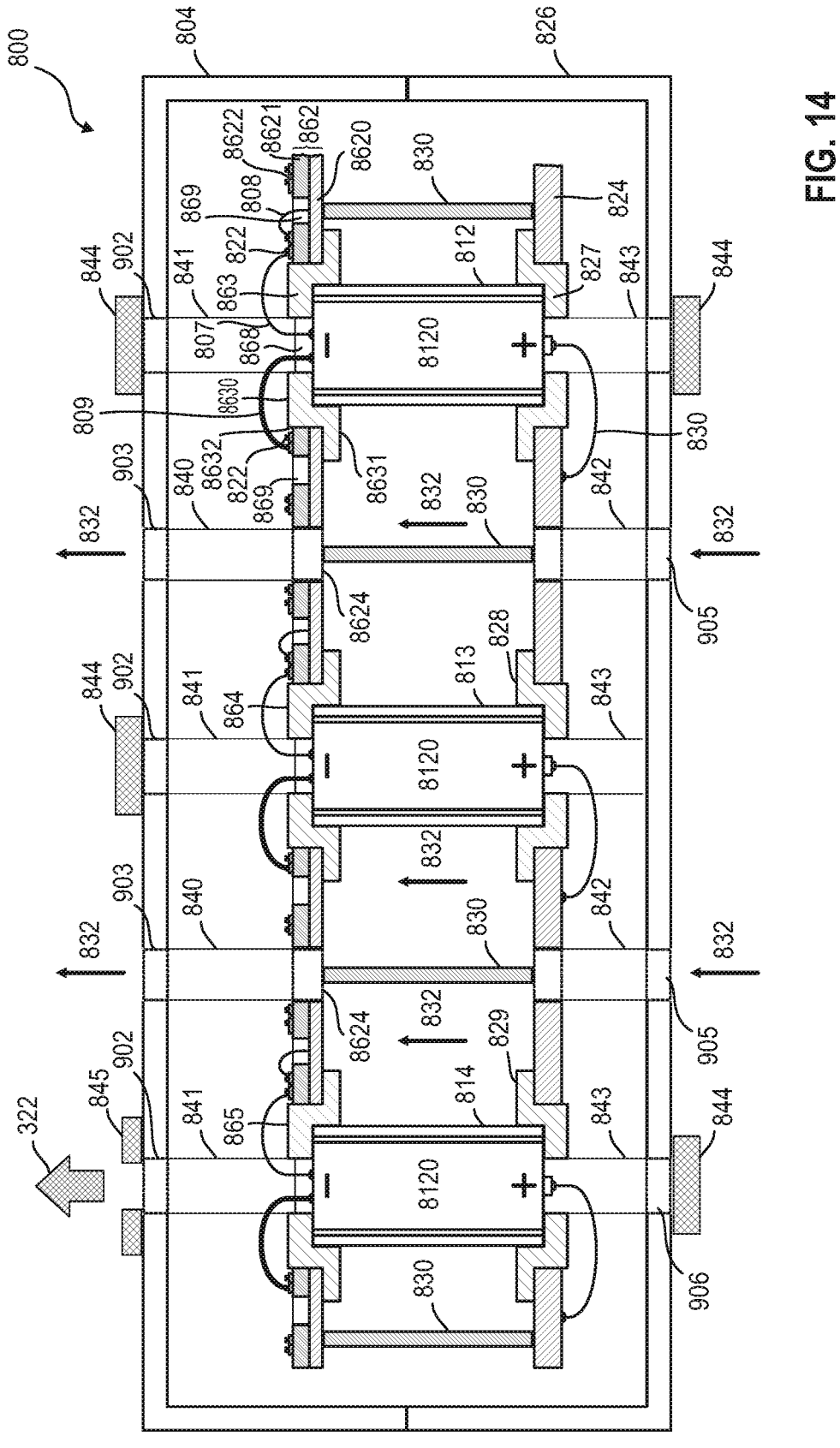
FIG. 14 illustrates an example of a battery module with a heat absorbing member where a fusible material covers a plurality of holes.

FIG. 14 illustrates in a simplified fashion an example of a battery module 800 with a heat absorbing member 830, where a fusible material 844 covers a plurality of top holes 902, and bottom holes 906. FIG. 14 is not a true-to-scale representation of the battery module 800.

The heat absorbing member 830 is arranged between the plurality of cell tubes 812-814.

As illustrated also in FIG. 9, all of the multiple battery cells 8120 are electrically connected in parallel with one another through the top plate 862 on one upper side and through the bottom plate 824 on one lower side. The top plate 862 and the bottom plate 824 each comprises a relatively thick conductive layer, such as for example an aluminium layer 8620, for conducting the relatively high currents that are delivered by the plurality of battery cells 8120 in parallel.

The top plate 862 is used to electrically connect two or more terminals of the multiple battery cells 8120 of the battery module 800. The multiple battery cells 8120 are arranged in the multiple cell tubes 812-814 so that negative terminals 815, with their predetermined breaking points, are directed toward the top housing 804, the top plate 862 electrically connects the negative terminals to one another via top wire bonding 807 through the first hole 868. As the top plate 862 is connected via the top wire bonding 807, the top wire bonding 807 functions as a fuse and decouple its mechanical, electrical and thermal connection responsive to a high temperature condition or a high electrical current condition. The top plate 862 may comprise a plurality of subplates. The top plate 862 may be a PCB and comprises conductive tracks or controlling or measurement signals.

The bottom plate 824 is also conductive and used to electrically connect two or more terminals of the multiple battery cells 8120 of the battery module 800. The multiple battery cells 8120 are arranged in the multiple cell tubes 812-814 so that positive terminals 816 are directed toward the bottom housing 826, the bottom plate 824 electrically connects the positive terminals 816 of the multiple battery cells 8120 to one another, via bottom wire bonding 8300. The bottom wire bonding 8300 can function as a fuse and decouple its mechanical, electrical and thermal connection responsive to a high temperature condition or a high electrical current condition. The bottom plate 824 may comprise a plurality of subplates.

A plurality of spacers 863-865, 827-829 are each accommodated in a corresponding first hole 868 through the top plate 862 and the corresponding second hole through the bottom plate 824. The spacers 863-865, 827-829 supports the battery cell 8120 and the corresponding cell tube 812-814 so that the spacers 863-865, 827-829, the corresponding first holes 868 through the top plate 862 and the corresponding second holes through the bottom plate 824, the corresponding battery cells 8120 and the cell tubes 812-814 can all be positioned coaxially and fixed with respect to one other.

One spacer 863-865, 827-829 circumferentially surrounds and supports the outer diameter at one end of each cell tube 812-814, such that a fluid-tight connection between each spacer 863-865, 827-829 and the one end of the corresponding cell tube 812-814 is provided.

The battery cell 8120 and the cell tube 812-814 are fixed and/or glued with top spacers 863-865 and bottom spacers 827-829 to the top plate 862 and to the bottom plate 824 respectively for providing said fluid-tight connection.

The top plate 862 comprises a printed circuit board (PCB) with an aluminium layer 8620 (which may be relatively thick), an isolating layer 8621, such as an epoxy layer, and a conductive layer 8622, such as a copper layer, (which may be relatively thin, such as thinner than the aluminium layer 8620).

The aluminium layer 8620 is used as conductive plate for connecting the different battery cells 8120 of the battery module 800. Using aluminium can reduce the weight of the top plate 862; alternatively, other conductive materials, including copper, could be used in place of or in addition to aluminium. Since the layer 8620 is relatively thick, it can withstand the addition of currents from the plurality of battery cells 8120 in the battery module.

The conductive layer 8622 is made up of a plurality of PCB tracks and PCB pads for mounting and connecting multiple electronic components 809, 822, such as multiple sensors 809, one or more switches (such as relays, MOS-FETs, IGBTs) and/or one or more controllers. Each track of the conductive layer 8622 is constructed to withstand the current from no more than one battery cell 8120, or a portion of the current from one battery cell 8120, so each track can be made relatively thin and light.

The multiple sensors 809 are used for monitoring a voltage, a current, a temperature, or an internal pressure of each or the plurality of battery cells 8120. The multiple sensors 809 are mounted on a PCB track of the conductive layer 8622, or, as the temperature sensor 809, between such a PCB track and the battery cell 8120. The sensors 809 are located remotely from the PCB tracks and connected to the PCB tracks to monitor parameters outside of the PCB track, such as the battery cell 8120 surface temperature.

The one or more switches (not shown) can be used for selectively disconnecting each single battery cell 8120, for example in case of over-temperature, over-current, over-voltage, over-pressure and/or other malfunctions of the battery cell.

The one or more controllers (not shown) may be used for controlling the transfer of energy from or to the multiple battery cells 8120 of the battery module 800 or may monitor one or more parameters of the multiple battery cells 8120. The one or more controllers can be in electrical communication with the multiple sensors 809, 822 to permit the one or more controllers to monitor at least some of the one or more parameters with the multiple sensors 809, 822.

The aluminium layer 8620 faces the bottom plate 824 while the conductive layer, tracks 8622 face the top direction of the battery module 800, toward the top housing 804. The conductive layer 8622 and the epoxy layer 8621 are milled in order to create blind holes 869 for electrically connecting via wire-bonding the conductive layer 8620 with the battery cell 8120, the electronic components 822 and one track of the conductive layer 8622.

The current from the cathode 815 of the battery cell 8120 flows directly through wire-bonding between the battery cell 8120 and the conductive track 8620 to the conductive track 8620. The cathode 815 of the battery cell 8120 connects through one wire bond 807 to one PCB track of the conductive layer 8622 and the current flows through this PCB track to one or a plurality of electronic components 809, 822 such as sensors and/or switches, and then, via another PCB track of the conductive track 8622 and another wire-bond 808 that goes through a blind hole 869, to the thick conductive layer 8620 where the current will be added to the currents from one or more other battery cells 8120.

The plurality of cell tubes 812-814, the battery cells 8120 and the heat absorbing member 830 are sandwiched between the top plate 862 and the bottom plate 824.

The top plate 862 is provided with a plurality of first holes 868 and first vent holes 8624, whereas each first hole 868 is coaxial with one cell tube 812-814 as outlined before. The bottom plate 824 also is configured with a plurality of second holes (not referenced) and second vent holes (not referenced), whereas each first hole 868 and second hole is coaxial with one cell tube 812-814.

The sandwiched structure is enclosed by a housing, provided by the top housing 804 and the bottom housing 826 of the battery module 800. The top housing 804 is configured with a plurality of top holes 902 and with top vent holes 903, wherein each top hole 902 is coaxial with one first hole 868 contained in the top plate 862.

Each top hole 902 of the top housing 804 is covered by a removable material, such as a material that will be removed or open by pressure, such as a valve or adhesive, or by a fusible material 844, such as for example a simple adhesive tape. Under normal operation, the covering material prevents air from entering the battery module 800 from the outside.

The bottom housing 826 is provided with bottom vent holes 905 and with a plurality of bottom holes 906 covered by the fusible material 844, comparable to the top housing 804.

A first set of protrusions 840 extend from the top housing 804 towards the top plate 862, each connecting one top vent hole 903 contained in the top housing 804 with one first vent hole 8624 contained in the top plate 862 fluidly. The fluid connection is leakproof, such that the air flow 832 though the housing is forced to exit the housing through the vent holes 8624, 903 being in fluid connection. The protrusions 840 form an integral part of the top housing 804 but might be replaced by other means, such as tubes connecting the vent holes 8624, 903 for providing a leakproof fluid connection.

A second set of fluid connections between the second vent holes contained in the bottom plate 824 and the bottom vent holes 905 contained in the bottom housing 826 is provided in this example by tubes 842.

A third set of fluid connections provided by tubes 841 extending from the top housing 804 towards the top plate 862, each connecting one top hole 902 contained in the top housing 804 with one first hole 868 contained in the top plate 862 fluidly. The fluid connection is leakproof, such that fumes and/or heat 322 generated in a thermal event by one battery cell 8120 exits the housing through the first hole 868 and the top hole 902 comprised in the top housing 804, when the top hole 902 contained in the top housing 804 is uncovered. The tubes 841 can be replaced by other means, such as protrusions forming an integral part of the top housing 804 for providing the leakproof fluid connection. Alternatively or in addition, the fluid connections can be provided by the cell tubes 812-814, or the spacers 863-865 that are extended in their length such that the first holes 868 are directly connected to the top hole 902 contained in the top housing 804.

A fourth set of fluid connection between the second holes in the bottom plate 824 and the bottom holes 906 in the bottom housing 826 is provided in this example by tubes 843 extending from the bottom housing 826 towards the bottom plate 824, each connecting one bottom hole 906 contained in the bottom housing 826 with one second hole contained in the bottom plate 824 fluidly. Not all of the second holes in the bottom plate 824 might be connected to one bottom hole 906 in the bottom housing 826 fluidly. It can be noticed in the center of the corresponding figure that the second hole contained in the bottom plate 824 is provided with a tube 843 that ends in a portion of the bottom housing 826. This provides a blind connection that doesn't need to be covered with a fusible material 844. The fourth set of fluid connections can be provided by similar means as disclosed for the third set of fluid connections, for instance, protrusions extending from the bottom housing 826 and/or cell tubes 812-814 and/or bottom spacers 827-829 that are extended in their length.

The tubes 841, 843 providing the third and fourth set of fluid connections, are made of a heat-resistant non-metallic material, such as ceramic, a composite glass fibre, or the like. The tubes 841, 843 providing the third and fourth set of fluid connections must not be confused with the cell tubes 812-814.

Under normal operation and in case of a thermal event the air flow 832 (direction indicated by arrows) enters the bottom vent holes 905 contained in the bottom housing 826 passes between the plurality of cell tubes 812-814 and the heat absorbing member 830 and exits through the top vent holes 903 contained in the top housing 804. The cell tubes 812-814 and the heat absorbing member 830 contained in the housing are cooled by the air flow 832. The air flow 832 includes fresh air from the outside, which might be humid and/or dusty.

Since the spacers 863-865, 827-829 provide a fluid-tight connection at each end of the cell tubes 812-814, the air flow 832 is prevented from entering the plurality of cell tubes 812-814 at one of the ends. However, the set of first and second fluid connections provided by the protrusions 840 extending from the top housing 804 and the tubes 842 arranged between bottom plate 824 and the bottom housing 826 forces the air flow 832 to pass between the cell tubes 812-814 and the heat absorbing member 830 and prevents the air flow 832 from getting into contact with the upper surface of the top plate 862 nor the lower face of the bottom plate 824.

These features independently or in combination avoid that the air flow 832 reaches the battery cells 8120 contained in the cell tubes 812-814 and/or electronic components 809, 822 mounted onto the upper surface of the top plate 862 and thus reducing the risk of damaging the battery cells 8120 and/or electronic components 809, 822 due to humidity and/or dust contained in the air flow 832.

If one of the multiple battery cells 8120 of the battery module 800 catches fire, the adhesive tape 845 covering the corresponding top hole 902 on the top housing 804 will be burned or otherwise removed, as the predetermined breaking point of the battery cell 8120 is directed towards the top housing 804. The corresponding top hole 902 will be revealed accordingly and heat 322 and fumes can exit the battery module 800 through the first hole 868 comprised in the top plate 862 and the top hole 902 comprised in the top housing 804. The other top holes 902 contained in the top housing 804 remain covered, such that heat 322 and fumes are prevented from entering said covered top holes 902.

The third and fourth set of fluid connections extending from the top housing 804 and the bottom housing 826 towards the first plate 862 and second plate 824, respectively, prevents that heat 322 and fumes reaches other battery cells 8120 contained in the remaining cell tubes 812, 813. The fluid connections also avoid fumes reaching the upper surface of the first plate 862.

Thus, further thermal events in the battery module 800 may be prevented as heat 322 exits via the corresponding fluid connection and short circuits in the electronic components 809, 822 placed on the upper surface of the top plate 862 may be avoided, as fumes containing particles are also forced to leave via the provided fluid connection.

It needs to be noted that the fusible material 844 covering the bottom holes 906 in the bottom housing 826 may remain intact even in a thermal event of one battery cell 8120, and thus remains to cover the corresponding bottom hole 906.

The air flow 832 continues to exit through the top vent holes 903 contained in the top housing 804 and carries the heat 322 and fumes away from the battery module 800, preferably to an exhaust channel 342 as illustrated in FIG. 3B illustrating a thermal event.

Figures 15A, 15B:
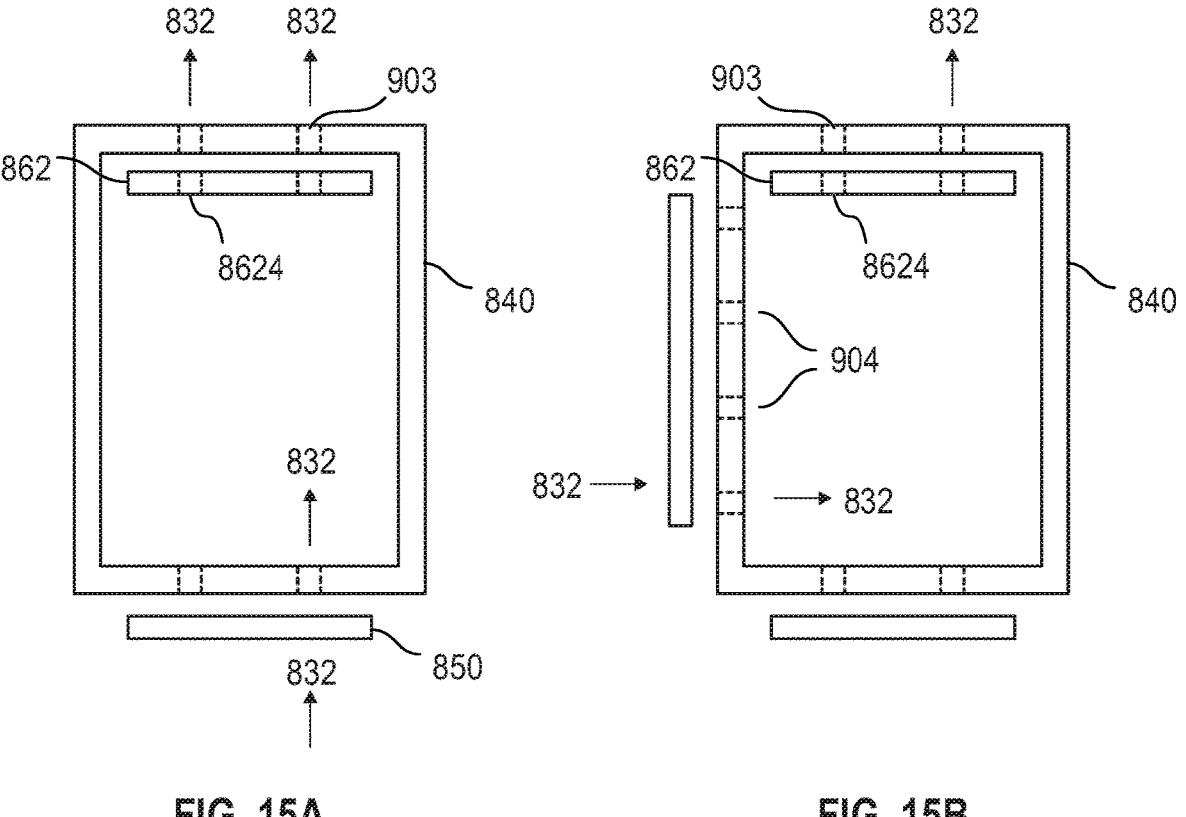
FIGS. 15A and 15B illustrate an example battery module with a fan attached to the housing.

FIGS. 15A and 15B illustrate a battery module 800 with a fan 850 attached to the housing 840.

FIG. 15A illustrates a housing 840 having an elongated shape, enclosing multiple other components of the battery module 800 as disclosed in at least one of the examples hereinbefore.

The housing 840 comprises multiple top vent holes 903 in a bottom and top portion. A fan 850 attached to a bottom portion blows or sucks air through the plurality of vent holes in the bottom portion, such that an air flow 832 enters into the housing 840, flows through the housing to cool the multiple devices, such as the cell tubes and the heat absorbing member (not shown) and exits through the plurality of vent holes 8624 in the top plate 862 and the plurality of top vent holes 903 in the top portion of the housing.

FIG. 15B illustrates a different example. A housing 840 has an elongated shape, enclosing multiple components of the battery module 800, as disclosed in at least one of the examples hereinbefore.

The housing 840 comprises multiple top vent holes 903 in a top and side portion. A fan 850 attached to one side portion blows or sucks air through the plurality of vent holes 904 in the side portion, such that an air flow 832 enters into the housing 840 flows through the housing to cool the multiple components, such as the cell tubes and the heat absorbing member (not shown) and exits through the plurality of vent holes 8624 in the top plate 862 and the plurality of top vent holes 903 in the top portion of the housing.

Configuring the battery module 800 with a fan 850, as illustrated in FIGS. 15A and 15B is advantageous as the cooling of the multiple devices is independent from an air flow provided by the air management system of the aircraft.

Alternatively, are the multiple components cooled exclusively using a fan (or an alternative means attached to the housing or comprised in the housing) and it is refrained from using the air management system of the vehicle.

It needs to be noted that all examples as disclosed can be combined with a fan, as illustrated in FIGS. 15A and 15B. Additional Features and Terminology Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecraft, hovercrafts, or the like.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms).

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

REFERENCE SYMBOLS IN THE FIGURES

100, 150 Aircraft
101 Aircraft housing
102, 832 Air flow
104, 180 Power Source
106 Inlet
108 Exhaust
110 Water Separator
112 Filter
160, 224 Motor
170 Management System
200 Operation System
210 Power Management System
212A, B First Battery Pack, Second Battery Pack
214 Warning Panel
216 Fuse and Relay
217 Converter
218 Cockpit Battery Pack
220 Motor Management System
222 Motor Controller
226 Throttle
300, 400, 500 Power System
304 Insulative Material
306, 362, 862 Top Plate, First Plate
308, 408, 508 Battery Housing, Housing
312, 314, 316, 318, 360, 8120 Battery Cell
324, 372, 824 Base Plate, Bottom Plate, Second Plate
326, 820 Circuit Board Assembly
322 Fire, Battery Cell Fire
334 Partially Enclosed Space
342, 542 Exhaust Channel
344, 444, 544 Inlet Channel
350 Battery Pack
352 Air Outlet
354 First Region of lower Integrity
442A First Exhaust Channel
442B Second Exhaust Channel
800 Battery Module
804 Top Housing
807 Wire Bond
812, 813, 814 Cell Tube
815 Negative Terminal, Anode
816 Positive Terminal, Cathode
824, 827, 828 Bottom Spacer
825 Connector
826 Bottom Housing
830, 831 Heat Absorbing Member
830A . . . 830D Heat absorbing sub member
832 Air flow
833 Shell
834 Heat Absorbing Material
835A Space
835B Contact Path
836 Elongated Surface
840 Elongated Face
844 Fusable material
850 Fan
863, 864, 865 Top Spacer
868, 902, 903, 8624 Hole, Valves, Vent Holes
900 Top Cover
The invention claimed is:

1. A battery module for an electrically-driven aircraft, the battery module comprising:
   a housing;
   a plurality of cell tubes configured to house a plurality of battery cells, each of the plurality of cell tubes having an elongated surface and being positioned in the housing spaced apart from other cell tubes of the plurality of cell tubes;

a heat absorbing member comprising a heat absorbing material and being arranged between at least two neighboring cell tubes, the heat absorbing material being configured to undergo a phase transition from an initial state of matter into a final state of matter when at least one of the plurality of cell tubes satisfies a temperature threshold in case of an explosion or a fire in at least one of the plurality of battery cells, wherein the heat absorbing member comprises a shell, and the heat absorbing material is enclosed by the shell; and a first plate arranged between one end of the plurality of cell tubes and the housing, the first plate having a lower surface and an upper surface, the upper surface being arranged to face away from the one end of the plurality of cell tubes, the housing being configured to allow an air flow to cool the plurality of cell tubes and the heat absorbing member, such that the air flow through the housing does not contact the upper surface of the first plate, wherein the first plate has a plurality of openings and a plurality of vent holes and is configured to support each of the plurality of cell tubes at one end, the first plate being configured to electrically connect to one pole of at least one battery cell of the plurality of battery cells via a wire bonding.

2. The battery module of claim 1, wherein the housing is configured to allow an air flow to cool the plurality of cell tubes and the heat absorbing member such that the air flow through housing does not enter the plurality of cell tubes.

3. The battery module of claim 1, wherein the housing is configured to allow the air flow through the plurality of vent holes in the first plate to cool the plurality of cell tubes and the heat absorbing member.

4. The battery module of claim 1, wherein the housing is configured to let the heat absorbing material exit through the plurality of vent holes in the first plate when the heat absorbing material is released by the heat absorbing member, such that the heat absorbing material does not contact the upper surface of the first plate.

5. The battery module of claim 1, wherein the housing comprises a plurality of vent holes that are fluidly connected to the plurality of vent holes in the first plate via a plurality of fluid connections.

6. The battery module of claim 5, wherein the plurality of fluid connections are provided by a plurality of projections extending from the housing to the plurality of vent holes in the first plate.

7. The battery module of claim 1, further comprising a second plate arranged between an other end of the plurality of cell tubes and the housing, the second plate having a plurality of openings and a plurality of vent holes and being configured to support each of the plurality of cell tubes at one end.

8. The battery module of claim 7, wherein the housing is configured such that an air flow through the housing enters the plurality of vent holes in the second plate and exits the plurality of vent holes in the first plate.

9. The battery module of claim 7, further comprising a fan configured to provide the air flow and arranged such that that the air flow through the housing enters the plurality of vent holes in the second plate and exits the plurality of vent holes in the first plate.

10. The battery module of claim 1, wherein the housing has an elongated face, with a plurality of vent holes distributed over the elongated face, that allow an air flow entering the housing to cool the plurality of cell tubes and the heat absorbing member and exit through the plurality of vent holes in the first plate.

11. The battery module of claim 1, wherein the first plate is a printed circuit board (PCB).

12. The battery module of claim 2, wherein the air flow through the housing is provided by an air management system that is external to the battery module and supported by an aircraft.

13. The battery module of claim 1, wherein the heat absorbing material is configured to generate a pressure inside the shell when at least parts of the heat absorbing material enter the final state of matter.

14. The battery module of claim 13, wherein the shell is configured to release the heat absorbing material when the pressure satisfies a pressure threshold.

15. The battery module of claim 1, wherein the heat absorbing material is configured to undergo the phase transition at a temperature above 330 K.

16. The battery module of claim 1, wherein the heat absorbing material is configured to undergo the phase transition at a first temperature and another phase transition at a second temperature different from the first temperature.

17. The battery module of claim 1, wherein the heat absorbing material comprises a mixture of materials.

18. The battery module of claim 1, wherein the heat absorbing material comprises a mixture of a first material that is a liquid at 320K and a second material that is a solid at 320K.

19. The battery module of claim 1, wherein the heat absorbing member comprises a plurality of heat absorbing sub members.

20. The battery module of claim 1, wherein the heat absorbing member is flexible.

21. The battery module of claim 1, wherein the heat absorbing member is in a cylindrical shape of a pouch.

22. The battery module of claim 1, wherein the heat absorbing member is arranged to surround partly or enclose each of the plurality of cell tubes and extend along an entire length of the elongated surface of the plurality of cell tubes.

23. The battery module of claim 1, wherein each of the plurality of cell tubes is configured to house no more than one battery cell within the cell tube, and each of the plurality of cell tubes is open at a first end of the cell tube to allow access to a cathode of one battery cell within the cell tube and open at a second end of the cell tube to allow access to an anode of one battery cell within the cell tube.

24. An aircraft powered by the battery module of claim 1.

25. A method for manufacturing a battery module, the method comprising:

arranging a heat absorbing member such that the heat absorbing member surrounds partly or encloses each of a plurality of cell tubes and extends along an entire length of an elongated surface of the plurality of cell tubes, the plurality of cell tubes being configured to house a plurality of battery cells, wherein the heat absorbing member comprises a shell enclosing heat absorbing material;

forming an assembly comprising the heat absorbing member and the plurality of cell tubes;

enclosing the assembly within the housing; and arranging a first plate between one end of the plurality of cell tubes and the housing, the first plate having a lower surface and an upper surface, the upper surface being arranged to face away from the one end of the plurality of cell tubes, the housing being configured to allow an air flow to cool the plurality of cell tubes and the heat absorbing member, such that the air flow through the housing does not contact the upper surface of the first plate, wherein the first plate has a plurality of openings and a plurality of vent holes and is configured to support each of the plurality of cell tubes at one end, the first plate being configured to electrically connect to one pole of at least one battery cell of the plurality of battery cells via a wire bonding.

26. The method of claim 25, wherein the heat absorbing material is configured to undergo a first phase transition at a first temperature and a second phase transition at a second temperature different from the first temperature.

27. A battery module for an electrically-driven aircraft, the battery module comprising:

a housing;

a plurality of cell tubes configured to house a plurality of battery cells, each of the plurality of cell tubes having an elongated surface and being positioned in the housing spaced apart from other cell tubes of the plurality of cell tubes; and a heat absorbing member comprising a heat absorbing material and being arranged between at least two neighboring cell tubes, the heat absorbing material being configured to undergo a phase transition from an initial state of matter into a final state of matter when at least one of the plurality of cell tubes satisfies a temperature threshold in case of an explosion or a fire in at least one of the plurality of battery cells, wherein each of the plurality of cell tubes is configured to house no more than one battery cell within the cell tube, and each of the plurality of cell tubes is open at a first end of the cell tube to allow access to a cathode of one battery cell within the cell tube and open at a second end of the cell tube to allow access to an anode of one battery cell within the cell tube.

28. The battery module of claim 27, wherein the housing is configured to allow an air flow to cool the plurality of cell tubes and the heat absorbing member such that the air flow through housing does not enter the plurality of cell tubes.

29. The battery module of claim 27, wherein the heat absorbing material is configured to undergo the phase transition at a first temperature and another phase transition at a second temperature different from the first temperature.

* * * * *